US011157098B2

(12) United States Patent
Su

(10) Patent No.: US 11,157,098 B2
(45) Date of Patent: Oct. 26, 2021

(54) MOUSE WITH TUNABLE CENTER OF GRAVITY

(71) Applicant: Corsair Memory, Inc., Fremont, CA (US)

(72) Inventor: Aliex Su, Fremont, CA (US)

(73) Assignee: Corsair Memory, Inc., Fremont, CA (US)

( * ) Notice: Subject to any disclaimer, the term of this patent is extended or adjusted under 35 U.S.C. 154(b) by 0 days.

(21) Appl. No.: 15/406,052

(22) Filed: Jan. 13, 2017

(65) Prior Publication Data

US 2017/0205900 A1    Jul. 20, 2017

Related U.S. Application Data

(60) Provisional application No. 62/278,665, filed on Jan. 14, 2016.

(51) Int. Cl.
*G06F 3/038* (2013.01)
*F16H 25/20* (2006.01)
*G06F 3/03* (2006.01)
*G06F 3/0354* (2013.01)

(52) U.S. Cl.
CPC ......... *G06F 3/038* (2013.01); *F16H 25/2015* (2013.01); *G06F 3/0317* (2013.01); *G06F 3/0383* (2013.01); *G06F 3/03543* (2013.01); *F16H 2025/204* (2013.01); *F16H 2025/2081* (2013.01); *G06F 2203/0332* (2013.01); *G06F 2203/0333* (2013.01)

(58) Field of Classification Search
CPC .... G06F 3/0354; G06F 3/03541; G06F 3/033; G06F 3/0317; G06F 3/038; G06F 3/0383; G06F 3/03543; G06F 2203/0333; G06F 2203/0332; F16H 2025/204; F16H 2025/2081; F16H 25/2015
USPC .................................................. 345/163–166
See application file for complete search history.

(56) References Cited

U.S. PATENT DOCUMENTS

| 6,717,573 | B1 * | 4/2004 | Shahoian | ................ | A63F 13/06 345/161 |
| 2003/0038774 | A1 * | 2/2003 | Piot | ........................ | G06F 3/016 345/156 |
| 2007/0251810 | A1 * | 11/2007 | Corcoran | ............ | G06F 3/03543 200/276.1 |
| 2012/0056812 | A1 * | 3/2012 | Chan | ................... | G06F 3/03543 345/163 |

* cited by examiner

*Primary Examiner* — Jimmy H Nguyen
(74) *Attorney, Agent, or Firm* — Carina M. Tan; Corsair Memory, Inc.

(57) ABSTRACT

A mouse with a tunable center of gravity is disclosed. According to certain embodiments, the mouse includes a moveable weight system that is used to move one or more weights from one position to another in the computer mouse. The relocation of one or more weights from one position to another in the computer mouse changes the center of gravity of the computer mouse.

5 Claims, 25 Drawing Sheets

MOUSE WITH TUNABLE CENTER OF GRAVITY

CROSS-REFERENCE TO RELATED APPLICATIONS

The present application claims the benefit of U.S. Provisional Patent Application Ser. No. 62/278,665, filed Jan. 14, 2016 and entitled "Mouse with Tunable Center of Gravity," which is hereby incorporated by reference in its entirety.

TECHNICAL FIELD

The present invention is directed to accessories for computers, and more specifically to aspects of a computer mouse.

BRIEF DESCRIPTION OF THE DRAWINGS

For a better understanding of the various embodiments of the invention, reference should be made to the description of embodiments below, in conjunction with the following drawings in which like reference numerals refer to corresponding parts throughout the figures.

DETAILED DESCRIPTION

Figure 1:
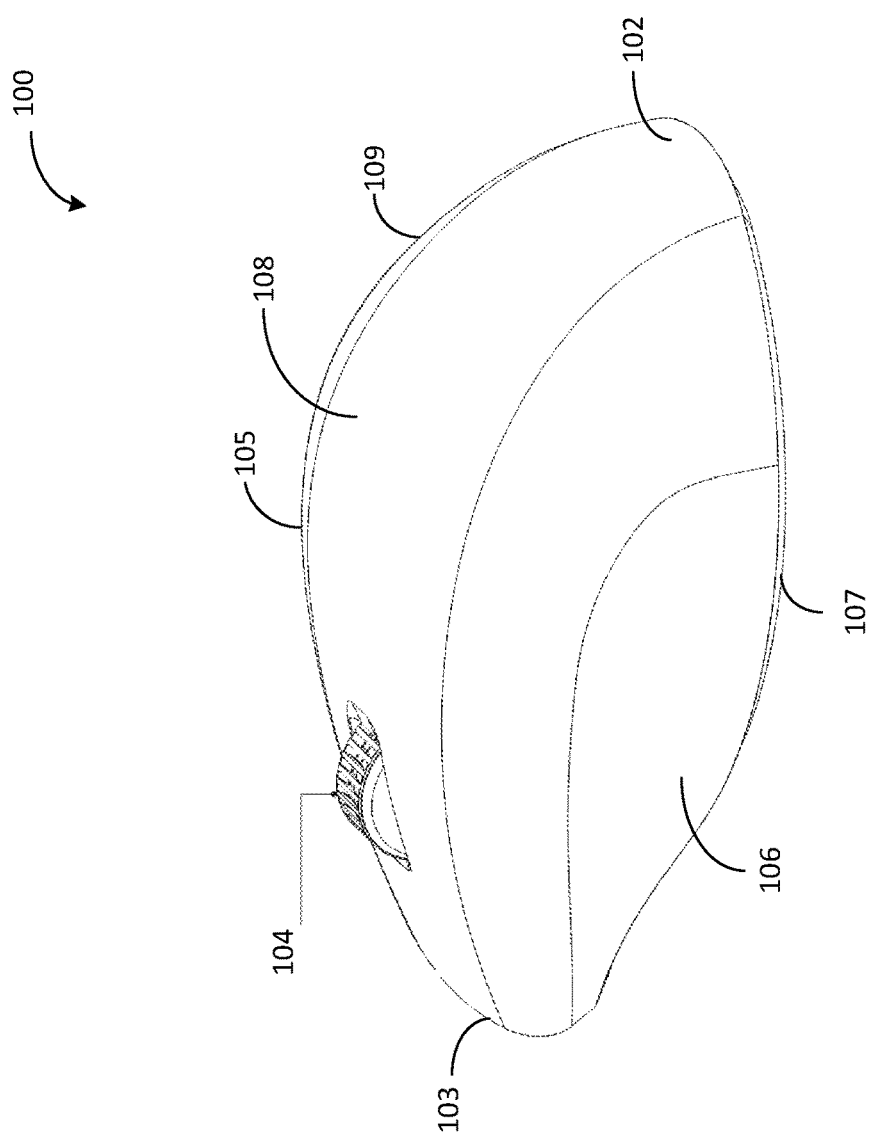
FIG. 1 illustrates a top left perspective view of the exterior of a computer mouse, according to certain embodiments.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a computer mouse includes a moveable weight system that is used to shift one or more weights from one position to another in the computer mouse. The shifting of one or more weights from one position to another in the computer mouse changes the center of gravity of the computer mouse.

According to certain embodiments, the moveable weight system associated with the computer mouse includes one or more weight trays for carrying the one or more weights. The moveable weight system can shift the weight trays to various positions in the computer mouse. The number of trays, the shape of the trays, the number of weights, and the type and shape of weights, vary from implementation to implementation. According to certain embodiments, the movable weight system of the computer mouse is associated with a center of gravity software application. The user may use the center of gravity software application to specify the desired location of the center of the gravity of the computer mouse and the software causes the motor of the moveable weight system to move the weight tray to a position such that the resulting center gravity is at the desired location specified by the user. In other embodiments, the user may shift the center of gravity of the computer mouse manually as described herein.

According to certain embodiments, the moveable weight system associated with the computer mouse can detect the presence of a given weight when the given weight is placed in a weight tray of the one or more weight trays associated with the moveable weight system.

According to certain embodiments, the moveable weight system detects the presence of a given weight in a given weight tray when the given weight acts as a switch bridge to short out a corresponding resistor in a resistor ladder associated with the given weight tray. By having different resistor values in the resistor ladder to correspond to different positions in the given weight tray, allows a micro controller unit that measures the voltage across the resistor ladder to determine the position of the weights in the given weight tray. For example, the resistor ladder comprises resistors with resistor values such that each combination of resistors, that has not been shorted out by one or more switch bridges, has a unique total resistance value for that combination of resistors, according to certain embodiments. For example, the resistor ladder is electrical circuitry on the side of the weight tray or it can be built into the weight tray, according to certain embodiments.

According to certain embodiments, the moveable weight system can detect the mass of a given weight based on the shape of the given weight.

According to certain embodiments, the moveable weight system can detect the mass of a given weight based on the configuration that the physical contact points or contact surfaces on a given weight (also herein referred to as weight contact points) make with the weight tray when the given weight is placed in the weight tray.

According to certain embodiments, the weight contact points on a given weight make contact with two or more contact points on the weight tray (also herein referred to as tray contact points) when the given weight is inserted in the weight tray. A micro controller unit in the computer mouse can detect which tray contact points on the weight tray are making contact with weight contact points in order to determine the type of weight that is inserted in the weight tray, according to certain embodiments. According to certain embodiments, each given weight has a set of weight contact points that form a unique pattern or orientation such that the weight contact points will contact a unique set of tray contact points when the given weight is placed in the weight tray. As another non-limiting example, a given weight can be identified by the distance between a given pair of tray contact points made by the weight contact points of the given weight. Thus, a micro controller unit can identify a given weight by the given weight's unique pattern of contact made with the tray contact points or by measuring the distance between a given pair of tray contact points made by the weight contact points of the given weight. According to certain embodiments, a given weight of at least a subset of the plurality of weights includes a notch that physically aligns the given weight in a predetermined position in the weight tray when the given weight is placed in the weight tray.

According to certain embodiments, each weight of at least a subset of the plurality weights includes a resistor embedded in the weight. According to certain embodiments, a micro controller unit can electrically measure the value of the embedded resistor using an analog-to-digital convertor circuit, for example.

According to certain embodiments, the weight tray of the moveable weight system in the computer mouse includes a wiper that moves over a variable resistor. The variable resistor is fixed in position relative to the weight tray so that as the weight tray moves in the mouse, the wiper that is fixed to the weight tray moves over the variable resistor, according to certain embodiments. A micro controller unit determines the position of the weight tray by measuring the resistance of the variable resistor, according to certain embodiments.

According to certain embodiments, the weight tray of the moveable weight system in the computer mouse is attached to a wiper of a slide potentiometer. A micro controller unit determines the position of the weight tray by measuring the resistance of the slide potentiometer as the weight tray slides in the track casing, according to certain embodiments.

According to certain embodiments, the weight tray has a single contact fixed to the weight tray. Further, at the side of the track in which the weight tray moves is a row of contact pads. Each contact pad is connected to the micro controller unit. When the weight tray moves to a new desired location in the track, the single contact fixed to the weight tray makes contact with the contact pad at the new location. The micro controller unit thus detects the new location of the weight tray.

According to certain embodiments, the moveable weight system in the computer mouse includes a mechanical absolute encoder and the micro controller unit receives information of the weight tray's absolute location from the mechanical absolute encoder.

According to certain embodiments, the moveable weight system in the computer mouse includes a mechanical incremental encoder and the micro controller unit receives information of the weight tray's relative location from the mechanical incremental encoder. Thus, the micro controller unit determines the absolute location of the weight tray by referencing the weight tray's relative location to a predetermined reference location, according to certain embodiments.

According to certain embodiments, there is a light source on one side of the track in which the weight tray is moving and there is a micro controller light sensor on the other side of the track. According to certain embodiments, the weight tray includes a row of differently sized holes. Each hole corresponds to an absolute location of the weight tray in the computer mouse. When the weight tray moves along the track from location to location, the light that passes through a given hole in the row of holes and that corresponds to a location is sensed by the micro controller light sensor. Thus, the micro controller light sensor can determine the location of the weight tray since each hole allows a different amount of light to pass through due to the different size of each hole. According to certain embodiments, the weight tray has a row of same sized holes. In such a case, the micro controller light sensor can determine the location of the weight tray by counting the number of light pulses passing in front of the micro controller light sensor as the weight tray is moving from a reference location.

FIG. 1 illustrates a top left perspective view of the exterior of a computer mouse, according to certain embodiments. The embodiments are not restricted to the shape of the computer mouse shown in FIG. 1. The purpose of FIG. 1 is to provide context for the description of a moveable weight system of the computer mouse. For example, FIG. 1 shows top right side perspective view of the exterior 109 of computer mouse 100 and that shows a scroll wheel 104. FIG. 1 also shows a front portion 103, a rear portion 102, a left side 106, a right side 105, and bottom portion 107 and a top portion 108 of computer mouse 100. Thus, for ease of explanation, the various components of the moveable weight system in the computer mouse are described herein in the context of the above positional/orientation labels (top, bottom, left, right, front, rear of a given computer mouse having a moveable weight system in the computer mouse).

Figure 2:
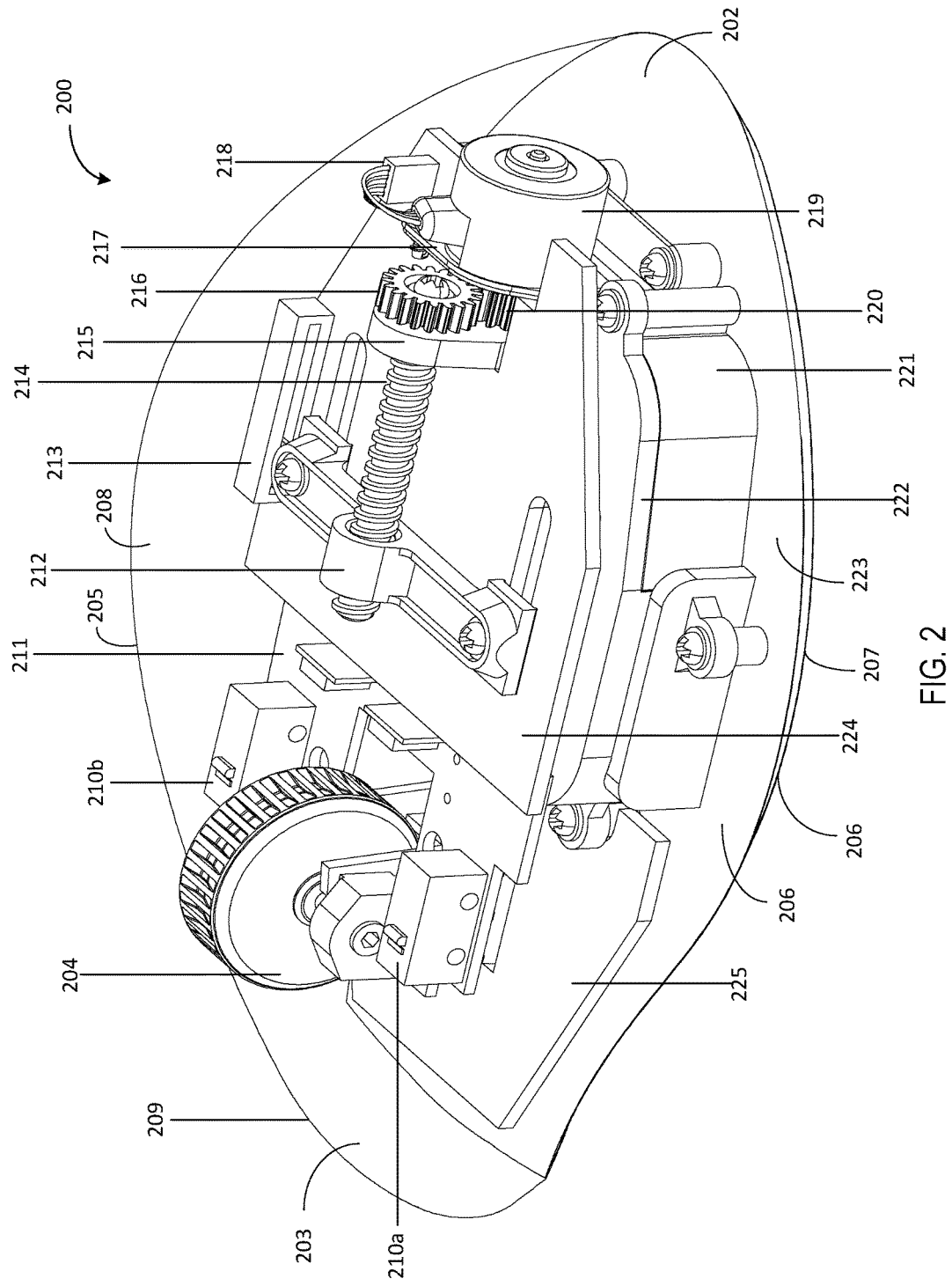
FIG. 2 illustrates a top left view of some of the internal components in a computer mouse, according to certain embodiments.

FIG. 2 illustrates a top left view of some of the internal components in a computer mouse, according to certain embodiments. The exterior 209 of the computer mouse 200 is transparent for purposes of describing FIG. 2 so that some of the internal components of the computer mouse are visible in FIG. 2, for ease of explanation. FIG. 2 shows a front portion 203 of the computer mouse, a rear portion 202 of the computer mouse, a left side 206 of the computer mouse, a right side 205 of the computer mouse, a top portion 208 of the computer mouse, a bottom portion 207 of the computer mouse, a scroll wheel assembly 204 (oriented towards the front 203 of the computer mouse), a left mouse switch 210a (associated with the left mouse click), a right mouse switch 210b (associated with the right mouse click), a scroll wheel printed circuit board assembly 211, a weight tray link 212, a slide potentiometer 213, a worm drive 214, a transmission stand 215, transmission gear 216, a motor bracket 217, a motor connector 218, a motor 219, a motor gear 220, a track casing 221, a track casing cover 222, a mouse bottom casing 223, a weight system printed circuit board assembly 224, and a mouse sensor printed circuit board assembly 225. The mouse sensor printed circuit board assembly is associated with a mouse sensor (not shown in FIG. 2). The mouse sensor printed circuit board assembly and its associated mouse sensor detect the movement of the mouse relative to a given surface (used for moving a cursor on a computer display interface, for example). The scroll wheel assembly and its associated scroll wheel printed circuit board assembly allows a user to perform a scrolling action to navigate on the computer display interface, for example).

The motor turns the motor gear, which turns the transmission gear, which in turn moves the worm drive, which in turn moves the weight tray via the weight tray link.

The weight tray is encased in track casing 221 and hence is not visible in FIG. 2. The weight tray can slide to different positions in track casing 221 to change the location of the center of gravity of the computer mouse. FIG. 2 shows one embodiment of the movable weight system wherein a motor is used to move a worm drive which in turn changes the position of the weight tray in the computer mouse. The weight tray link attaches the weight tray to the worm drive. As the weight tray (and one or more weights) is moved, the position of the weight tray is reported to the movable weight system. The weight system printed circuit board assembly communicates with the movable weight system as to the weight tray location as well as the type of weights that are present in the weight tray. The weight tray may have a plurality of weight slots, according to certain embodiments. It is up to the user of the computer mouse to decide which slots to fill with weights and what type of weights to put into the weight tray, depending on the weight distribution desired by the user. According to certain embodiments, the user can use software to communicate with firmware on the computer mouse and the firmware controls the motor that moves the weight tray to a desired position. As a non-limiting example, the user can select a desired center of gravity (C.G.) position for the computer mouse using associated software of the movable weight system and the software will communicate with the firmware and motor to move the weight tray to a position that corresponds to the C.G. position selected by the user. The embodiments are not restricted to motorized control of the movement of the weight tray. In certain embodiments, the user can manually move the weight tray in the computer mouse, as described in greater detail herein. In FIG. 2, the slide potentiometer is connected to the weight tray link. A micro controller unit determines the position of the weight tray by measuring the resistance of the slide potentiometer as the weight tray slides in the track casing, according to certain embodiments. The embodiments are not restricted to using a slide potentiometer for determining the position of the movable weight tray. Other devices and methods can be used to determine the position of the movable weight tray. For example, the movable weight tray in the computer mouse includes a wiper that moves over a variable resistor. As another non-limiting example, the weight tray has a single contact fixed to the weight tray. At the side of the track in which the weight tray moves, is a row of contact pads. Each contact pad is connected to the micro controller unit. When the weight tray moves to a new desired location along the track, the single contact fixed to the weight tray makes contact with the contact pad at the new location. The micro controller unit thus detects the new location of the weight tray. Other examples include light sensors, mechanical absolute encoders, mechanical incremental encoders, etc., can be used to determine the location of the weight tray as described herein.

Figure 3:
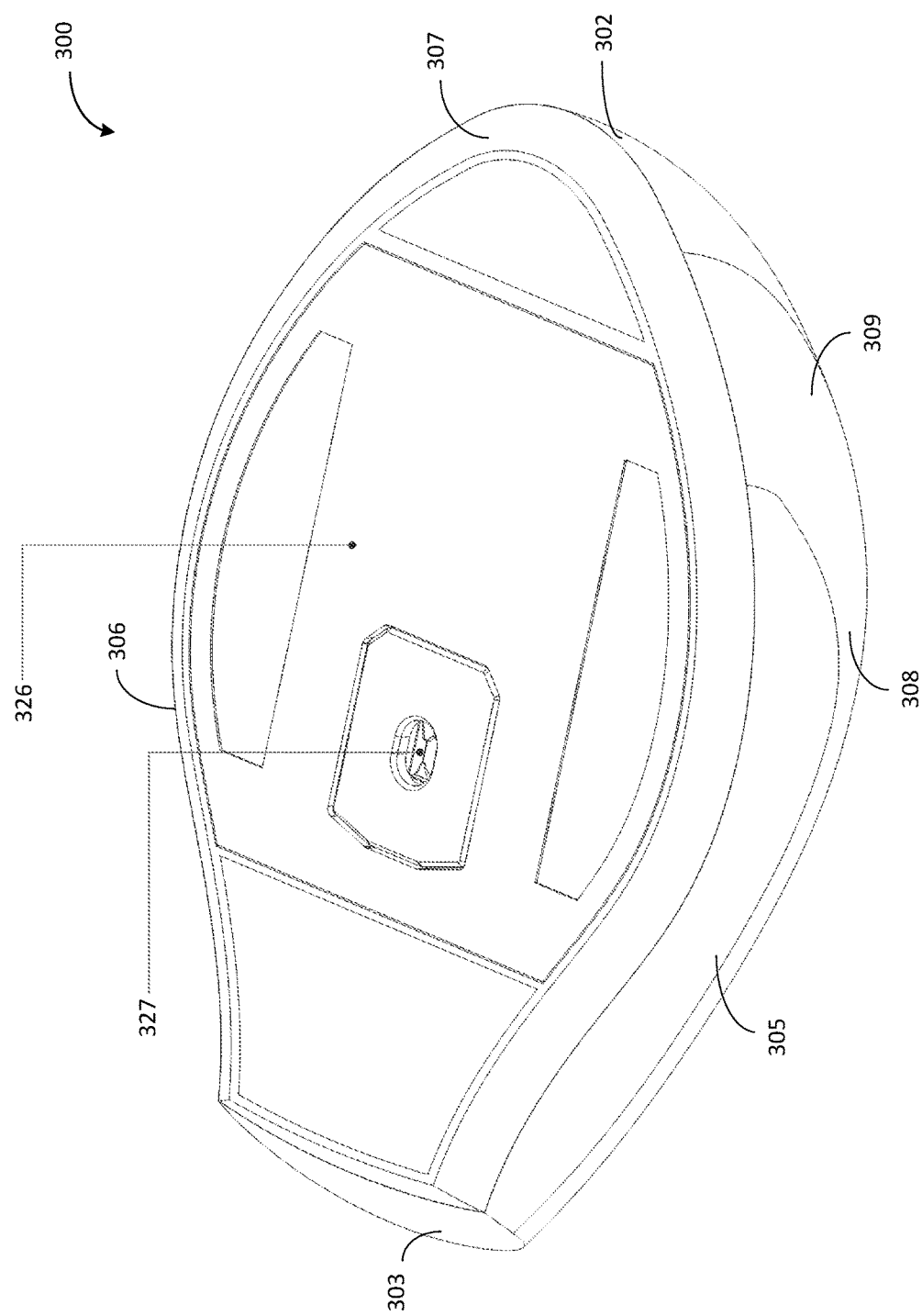
FIG. 3 illustrates a bottom right perspective view of the exterior of a computer mouse, according to certain embodiments.

FIG. 3 illustrates a bottom right perspective view of the exterior of a computer mouse, according to certain embodiments. The embodiments are not restricted to the shape of the computer mouse shown in FIG. 3. The purpose of FIG. 3 is to provide context for the description of a moveable weight system of the computer mouse. For example, FIG. 3 shows bottom right side perspective view of the exterior 309 of computer mouse 300. FIG. 3 also shows a front portion 303, a rear portion 302, a left side 306, a right side 305, a bottom portion 307, a top portion 308, a mouse sensor 327, and a bottom cover 326 of computer mouse 300. Thus, for ease of explanation, the various components of the moveable weight system in the computer mouse are described herein in the context of the above positional/orientation labels (exterior, top, bottom, left, right, front, rear of a given computer mouse having a moveable weight system in the computer mouse).

Figure 4:
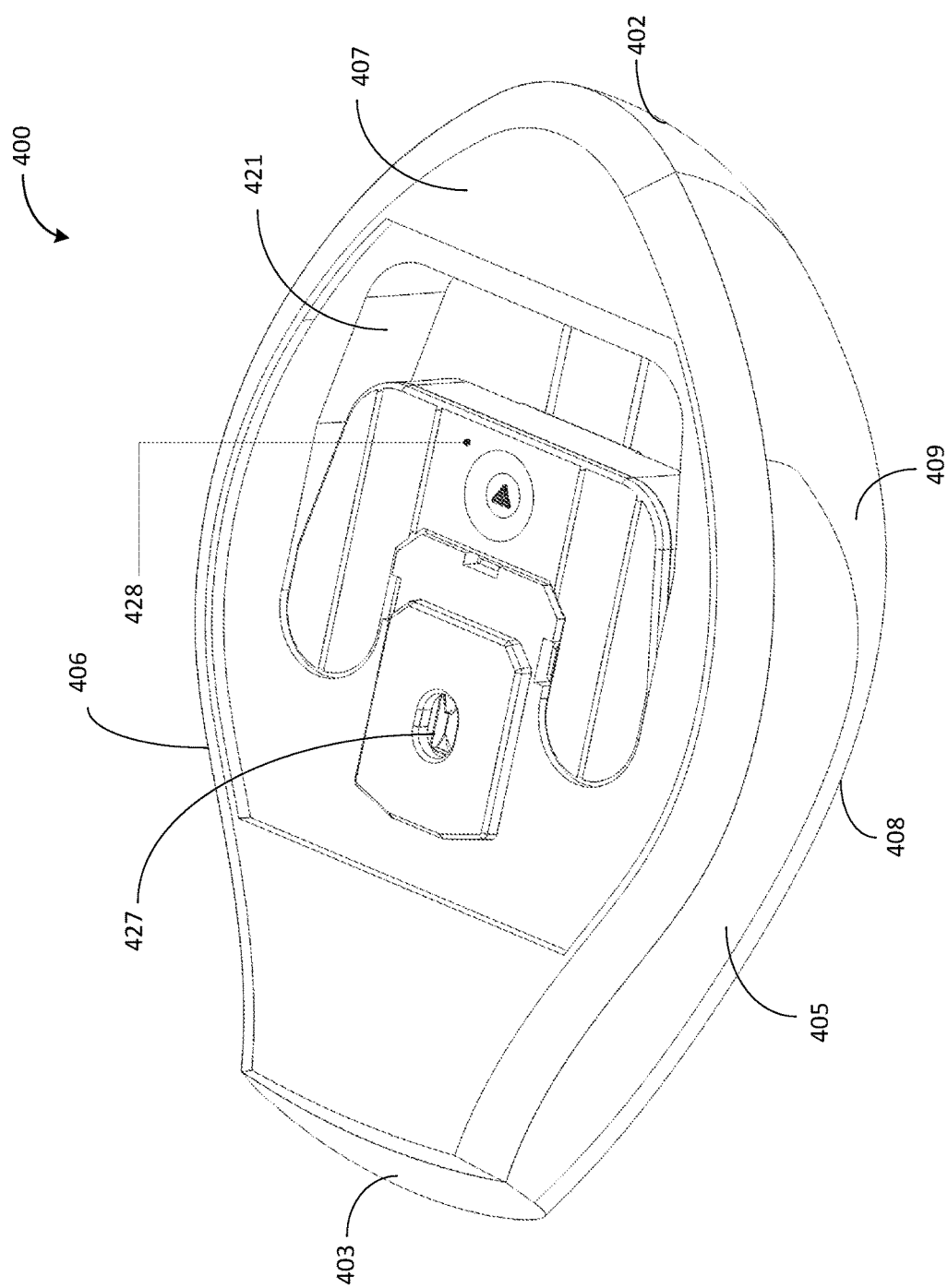
FIG. 4 illustrates a bottom right perspective view of the exterior of a computer mouse, according to certain embodiments.

FIG. 4 illustrates a bottom right perspective view of the exterior of a computer mouse, according to certain embodiments. The embodiments are not restricted to the shape of the computer mouse shown in FIG. 4. The purpose of FIG. 4 is to provide context for the description of the exterior of a moveable weight tray (the bottom cover of the mouse is removed to reveal the weight tray assembly) relative to other components of the computer mouse. FIG. 4 also shows an exterior 409 of computer mouse 400, a front portion 403, a rear portion 402, a left side 406, a right side 405, a bottom portion 407, a top portion 408, a mouse sensor 427, a movable weight tray assembly 428, and a track casing 421 of computer mouse 400. The weight tray assembly can slide along the track casing in order to change the weight distribution of the computer mouse to suit the preferences of a given user.

Figure 5:
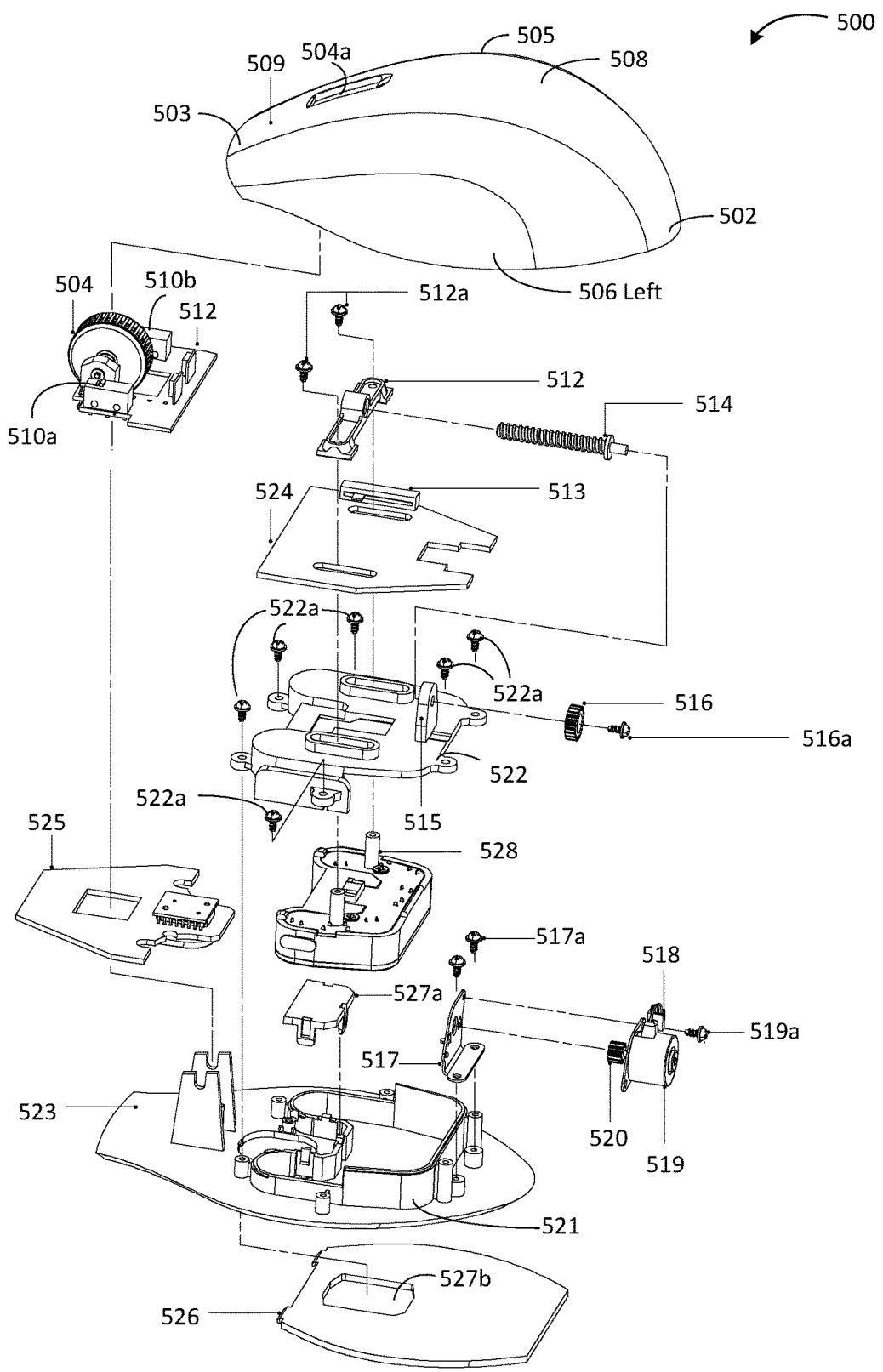
FIG. 5 illustrates a top-front-right perspective exploded view of a computer mouse that has a movable weight system, according to certain embodiments.

FIG. 5 illustrates a top-front-right perspective exploded view of a computer mouse 500 that has a movable weight system, according to certain embodiments. FIG. 5 shows a top exterior 509 of computer mouse 500, a front portion 503, a rear portion 502, a left side 506, a right side 505, a top portion 508, a scroll wheel aperture 504a, scroll wheel assembly 504, a left mouse switch 510a (associated with the left mouse click), a right mouse switch 510b (associated with the right mouse click), a scroll wheel printed circuit board assembly 511, a weight tray link 512 (and associated screws 512a), a slide potentiometer 513 (as explained herein, other devices and methods can be used to determine the position of the movable weight tray), a worm drive 514, a weight system printed circuit board assembly 524, a transmission stand 515, transmission gear 516 (and associated screw 516a), a track casing cover 522 (and associated screws 522a), a movable tray assembly 528 (different types of movable trays can be used as explained herein), a mouse sensor printed circuit board assembly 525, a motor bracket 517 (and associated screws 517a), a motor connector 518, a motor 519 (and associated screws 519a), a motor gear 520, a mouse sensor cover 527a (mouse sensor is not shown in FIG. 5), a track casing 521, a mouse bottom casing 523, a bottom cover 526 with a sensor aperture 527b. The embodiments are not restricted to motorized control of the movement of the weight tray. Manual systems can be used to move the movable tray as described herein.

Figure 6A:
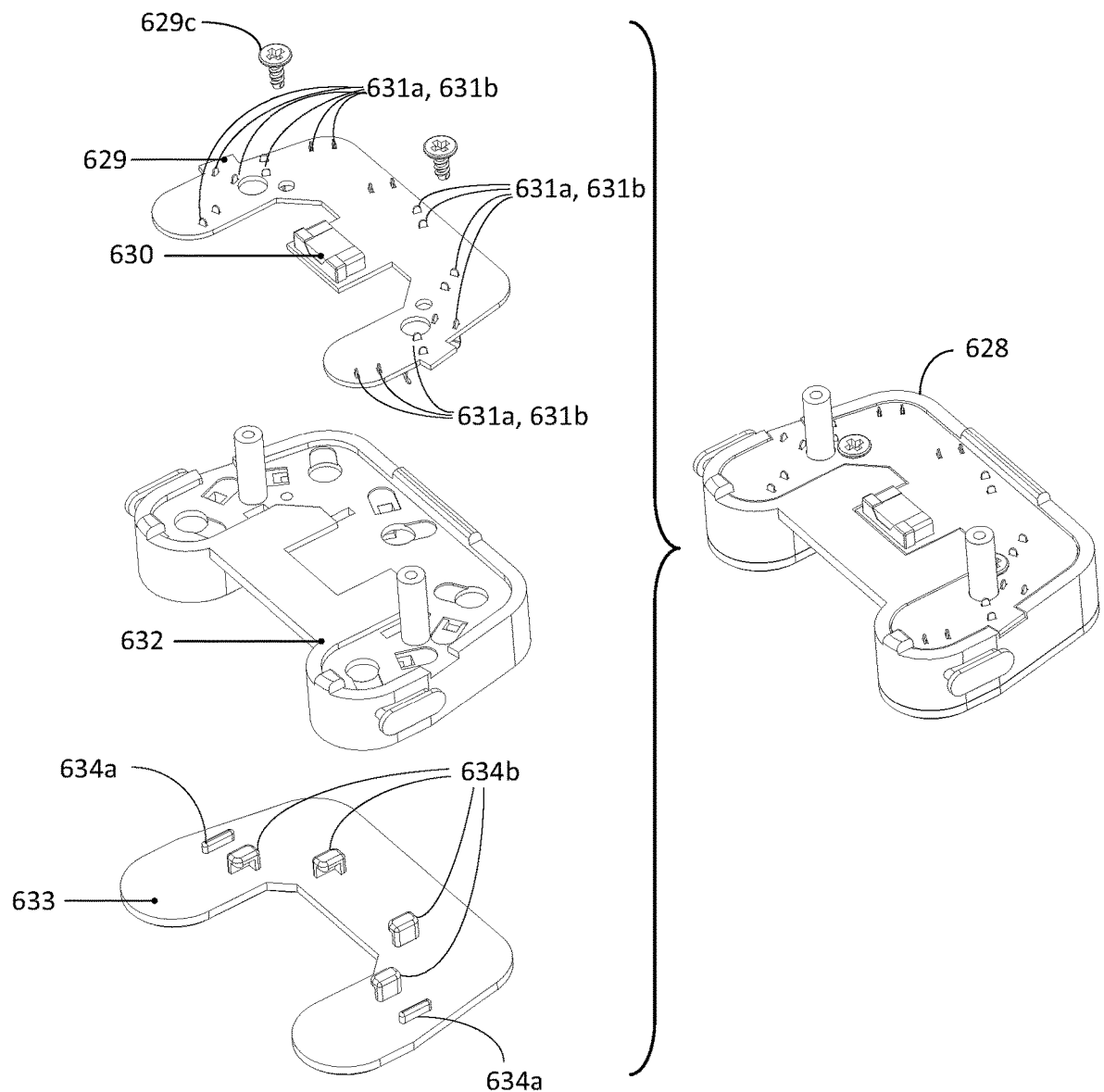
FIG. 6A illustrates an exploded top perspective view of a movable weight tray assembly, according to certain embodiments.
Figure 7A:
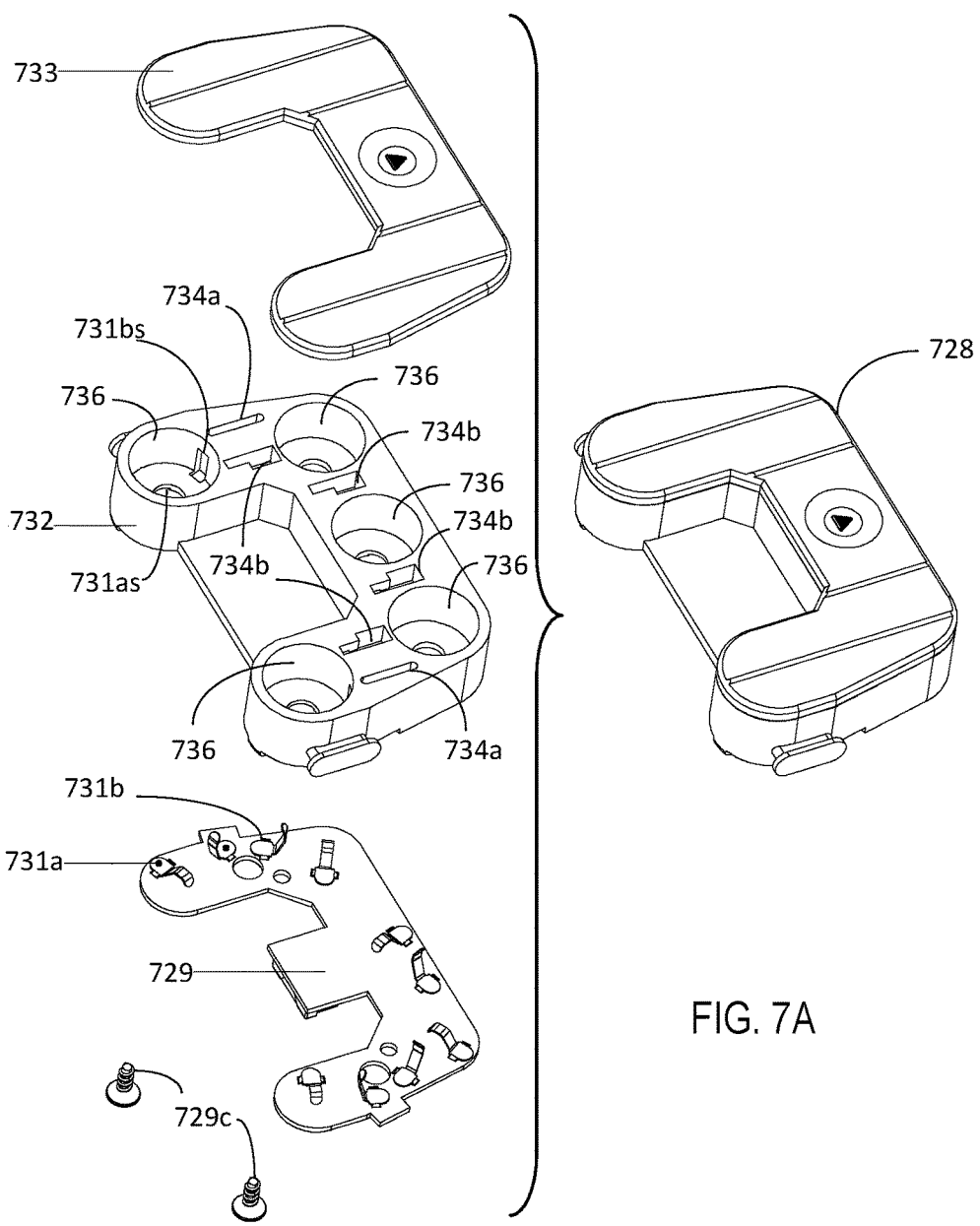
FIG. 7A illustrates an exploded bottom perspective view of the movable weight tray assembly of FIG. 6A, according to certain embodiments.

FIG. 6A illustrates an exploded top perspective view of a movable weight tray assembly, according to certain embodiments. Movable weight tray assembly 628 comprises a weight tray printed circuit board assembly 629, a weight tray 632, and a weight tray cover 633. Weight tray printed circuit board assembly 629 includes associated screws 629c, weight tray electrical connector 630, a plurality weight contact pins (631a, 631b) of which only the filet of the weight contact pins are visible in FIG. 6A (FIG. 7A shows the flip side of weight tray printed circuit board assembly with the weight contact pins). Tray cover 633 includes rib guides 634a (to guide the tray cover into position on the weight tray) and snap hooks 634b to hook the weight tray cover onto the weight tray, according to certain embodiments.

Figure 6B:
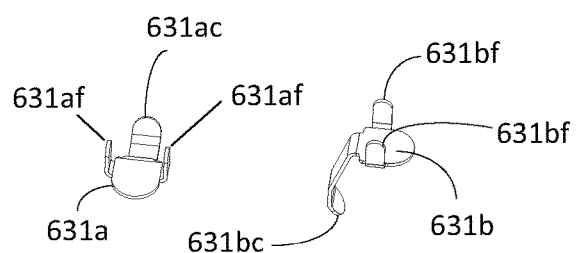
FIG. 6B illustrates a magnified view of the weight contact pins, according to certain embodiments.

FIG. 6B illustrates a magnified view of the weight contact pins, according to certain embodiments. FIG. 6B shows two types of weight contact pins: 1) a bottom pin 631a, and 2) a body pin 631b. Bottom pin 631a includes a contact tongue 631ac and a pair of filets 631af for affixing the bottom pin to the weight tray printed circuit board assembly as shown in FIG. 6A. Body pin 631b includes a contact tongue 631bc and a pair of filets 631bf for affixing the bottom pin to the weight tray printed circuit board assembly as shown in FIG. 6A.

FIG. 7A illustrates an exploded bottom perspective view of the movable weight tray assembly of FIG. 6A, according to certain embodiments. Movable weight tray assembly 728 comprises a weight tray cover 733, a weight tray 732, and a weight tray printed circuit board assembly 729 (and associated screws 729c). Weight tray 732 includes a plurality of weight slots 736, rib guide slots 734a (for receiving rib guides 634a of FIG. 6A, for example), and snap hooks slots 734b (for receiving snap hooks 634b of FIG. 6A, for example). Weight tray printed circuit board assembly 729 includes a plurality of weight contact pins such as bottom pins 731a and body pins 731b. Weight slot 736 includes an bottom pin aperture 731as for bottom pin tongue 731ac, and a tongue slot 731bs for body pin tongue 731bc.

Figure 7B:
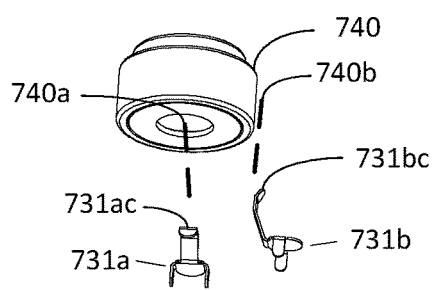
FIG. 7B illustrates an example of a weight that can be used in weight slot of the weight tray described with reference to FIG. 7A, according to certain embodiments.

FIG. 7B illustrates an example of a weight that can be used in weight slot 736 of the weight tray 732 described above with reference to FIG. 7A. FIG. 7B shows a bottom perspective view of a weight 740 in relation to contact pins such as bottom pin 731a and body pin 731b. When weight 740 is placed in the weight slot 736, contact tongue 731ac of bottom pin 731a makes contact with the printed circuit board of the weight 740a and contact tongue 731bc of body pin 731b makes contact with the side 740b of the weight, according to certain embodiments.

Figure 8B:
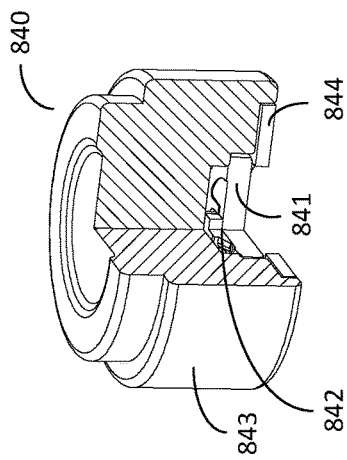
FIG. 8B illustrates a 3-D cross sectional view of a given weight, according to certain embodiments.
Figure 8C:
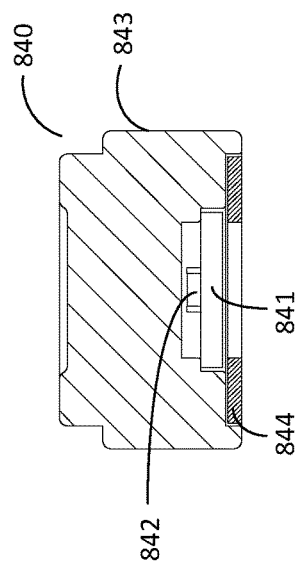
FIG. 8C illustrates a 2-D cross sectional view of a given weight, according to certain embodiments
Figure 8A:
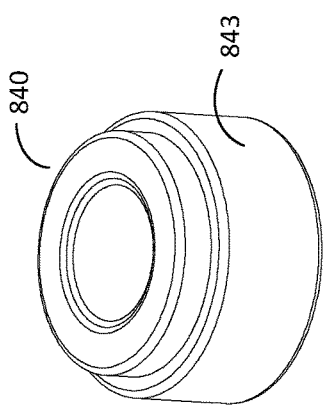
FIG. 8A illustrates an exploded top perspective view of a weight structure, according to certain embodiments.
Figure 8A:
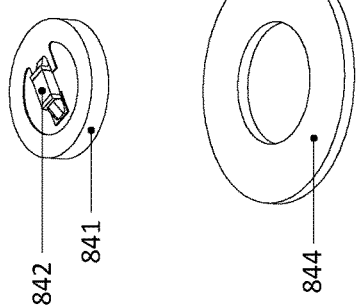

FIG. 8A illustrates an exploded top perspective view of a weight structure, according to certain embodiments. The embodiments are not restricted to the shape of the weight as shown in FIG. 8A. The purpose of FIG. 8A is to illustrate certain components of a given weight structure wherein such components allow for the given weight to be identified by the movable weight system. The shape of a given weight may vary from implementation to implementation. FIG. 8A shows that weight 840 includes a main body 843, a printed circuit board 841 and a protective sheath 844, according to certain embodiments. Printed circuit board 841 (PCB 841) includes a resistance 842, according to certain embodiments.

FIG. 8B illustrates a 3-D cross sectional view of weight 840, according to certain embodiments. FIG. 8B shows resistance 842, and PCB 841 in contact with the main body 843 of weight 840. FIG. 8B also shows protective sheath 844. Protective sheath 844 prevents a given bottom pin of the weight tray from contacting the main body 843 of weight 840 when weight 840 is placed in the weight tray. A given bottom pin makes contact with the PCB 841 when weight 840 is placed in the weight tray.

FIG. 8C illustrates a 2-D cross sectional view of weight 840, according to certain embodiments. FIG. 8C shows protective sheath 844, resistance 842, and PCB 841 in contact with the main body 843 of weight 840.

Figure 9B:
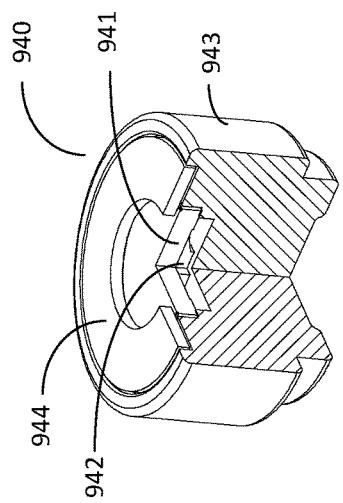
FIG. 9B illustrates a 3-D cross sectional view of a given weight, according to certain embodiments.
Figure 9C:
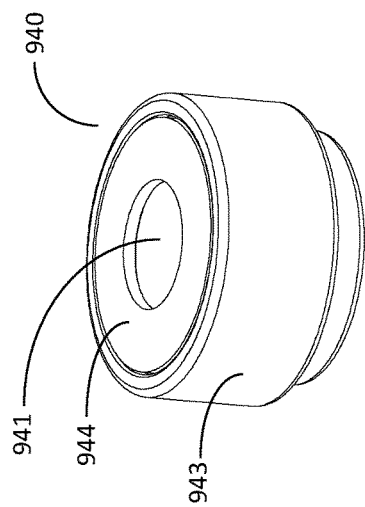
FIG. 9C illustrates a bottom perspective view of a given weight, according to certain embodiments.
Figure 9A:
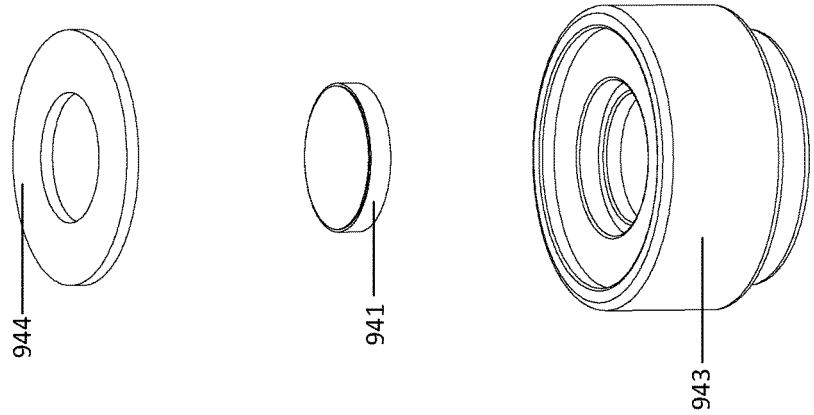
FIG. 9A illustrates an exploded bottom perspective view of the weight structure, according to certain embodiments.

FIG. 9A illustrates an exploded bottom perspective view of the weight structure, according to certain embodiments. FIG. 9A shows a protective sheath 944, a PCB 941 and a main body 943 of weight 940.

FIG. 9B illustrates a 3-D cross sectional view of weight 940, according to certain embodiments. FIG. 9B shows resistance 942, and PCB 941 in contact with the main body 943 of weight 940. FIG. 9B also shows protective sheath 944. Protective sheath 944 prevents a given bottom pin of the weight tray from contacting the main body 943 of weight 940 when weight 940 is placed in the weight tray. A given bottom pin makes contact with the PCB 941 when weight 940 is placed in the weight tray.

FIG. 9C illustrates a bottom perspective view of weight 940, according to certain embodiments. FIG. 9C shows protective sheath 944, a PCB 941 and main body 943 of weight 940.

Figure 10:
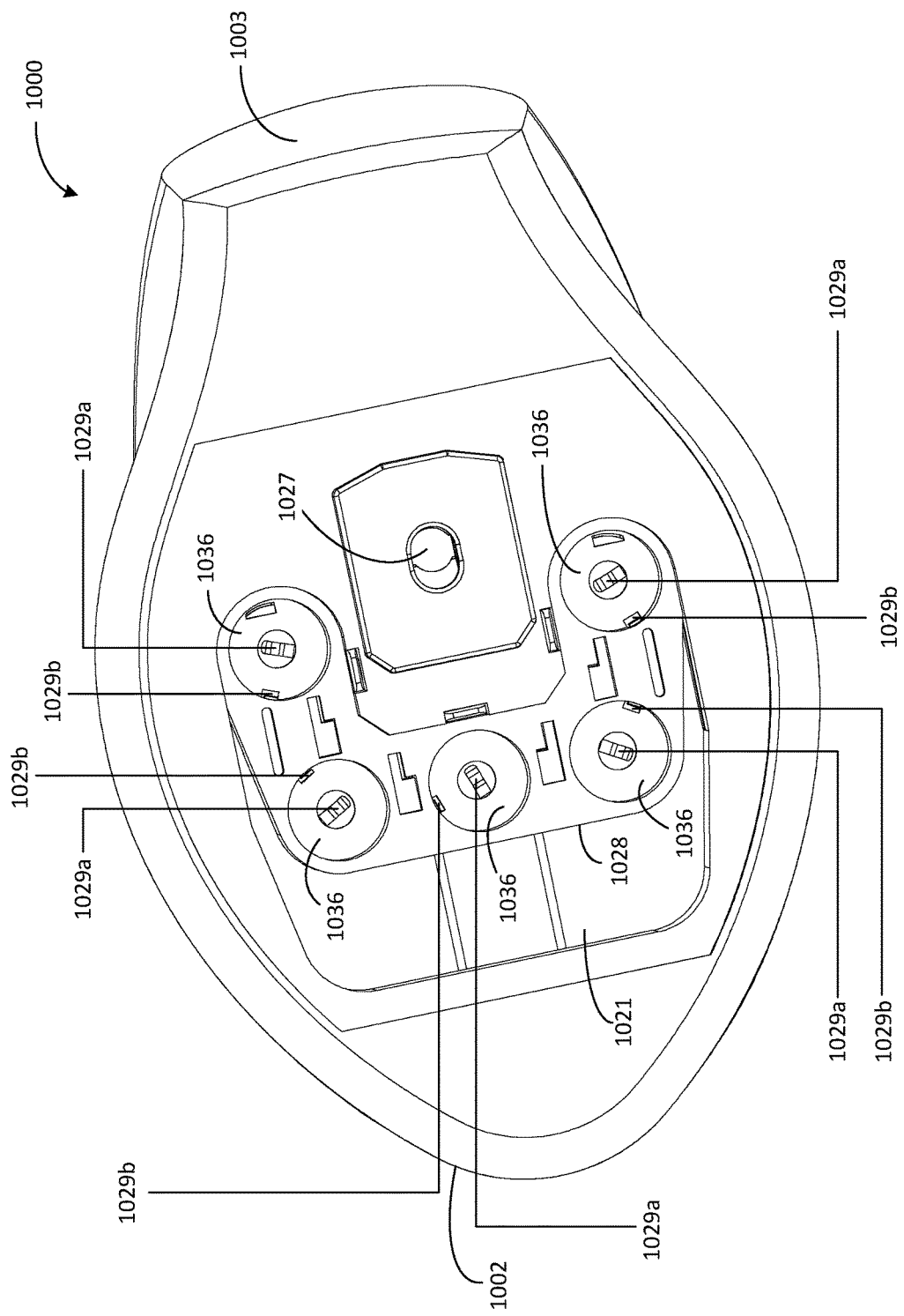
FIG. 10 illustrates a bottom view of a computer mouse, according to certain embodiments.

FIG. 10 illustrates a bottom view of a computer mouse, according to certain embodiments. The embodiments are not restricted to the shape of the computer mouse shown in FIG. 10. The purpose of FIG. 10 is to provide context for the description of a moveable weight tray (the bottom cover of the mouse is removed to reveal the weight tray assembly and the weight tray cover is also removed to reveal the weight slots) relative to other components of the computer mouse. FIG. 10 shows a front portion 1003, a rear portion 1002, a mouse sensor 1027, a movable weight tray assembly 1028 (with its weight tray cover removed for purposes of revealing a plurality of weight slots 1036), and a track casing 1021 of computer mouse 1000. The weight tray assembly can slide in the track casing in order to change the weight distribution of the computer mouse to suit the preferences of a given user. At each weight slot 1036, there can be seen a corresponding bottom pin 1029a and a corresponding body pin 1029b (the bottom pins and body pins are associated with the weight tray printed circuit board assembly, according to certain embodiments.

Figure 11:
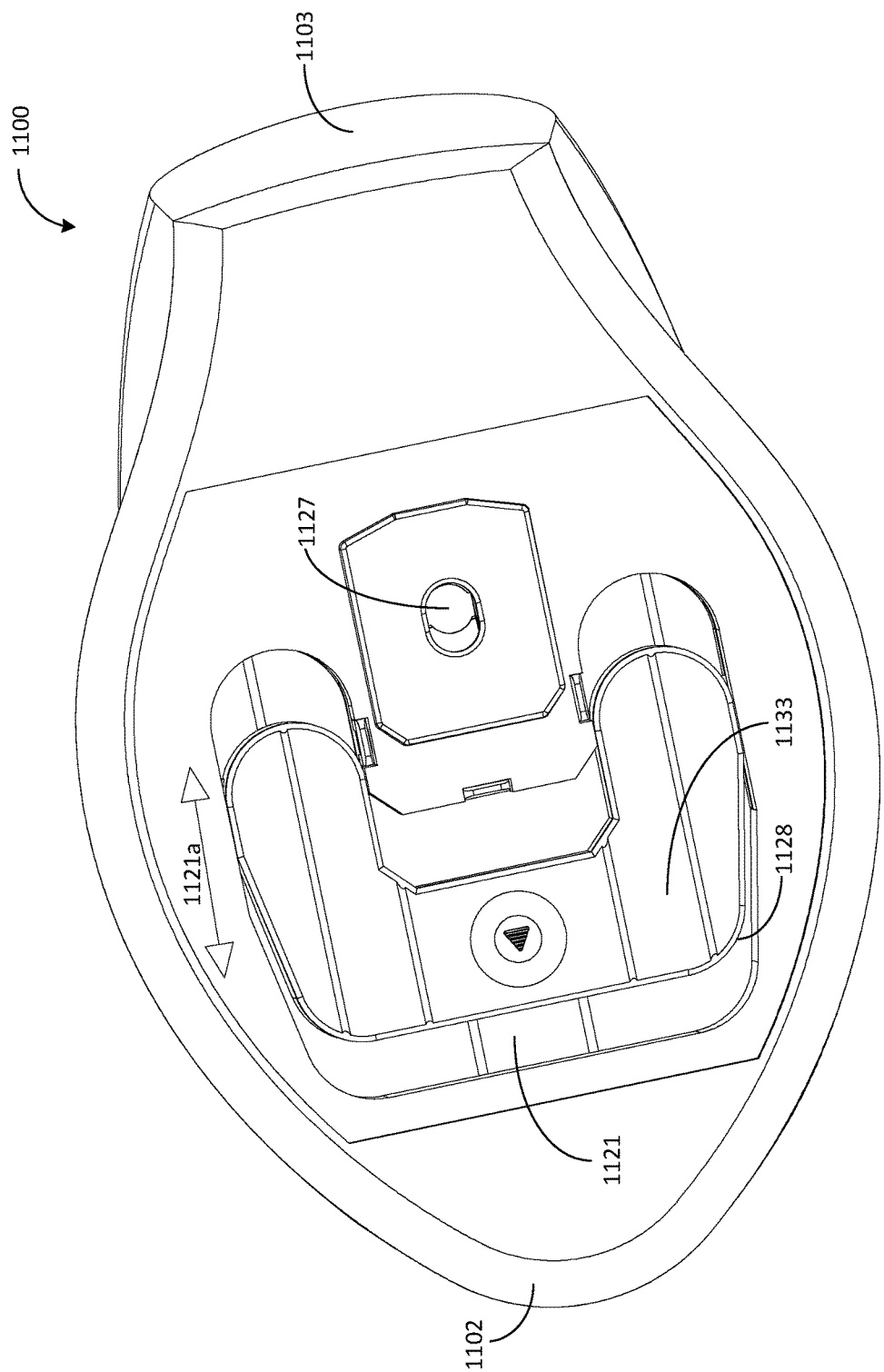
FIG. 11 illustrates motorized control of the movable tray assembly of a computer mouse, according to certain embodiments.

FIG. 11 illustrates motorized control of the movable tray assembly of a computer mouse, according to certain embodiments. FIG. 11 shows a front portion 1103, a rear portion 1102, a mouse sensor 1127, a movable weight tray assembly 1128 with its weight tray cover 1133 and a track casing 1121 of computer mouse 1100. A motor assembly (not show in FIG. 11) in the computer mouse 1100 can cause the weight tray assembly to slide back and forth (1121a) along the track casing 1121 in order to change the weight distribution of the computer mouse.

Figure 12:
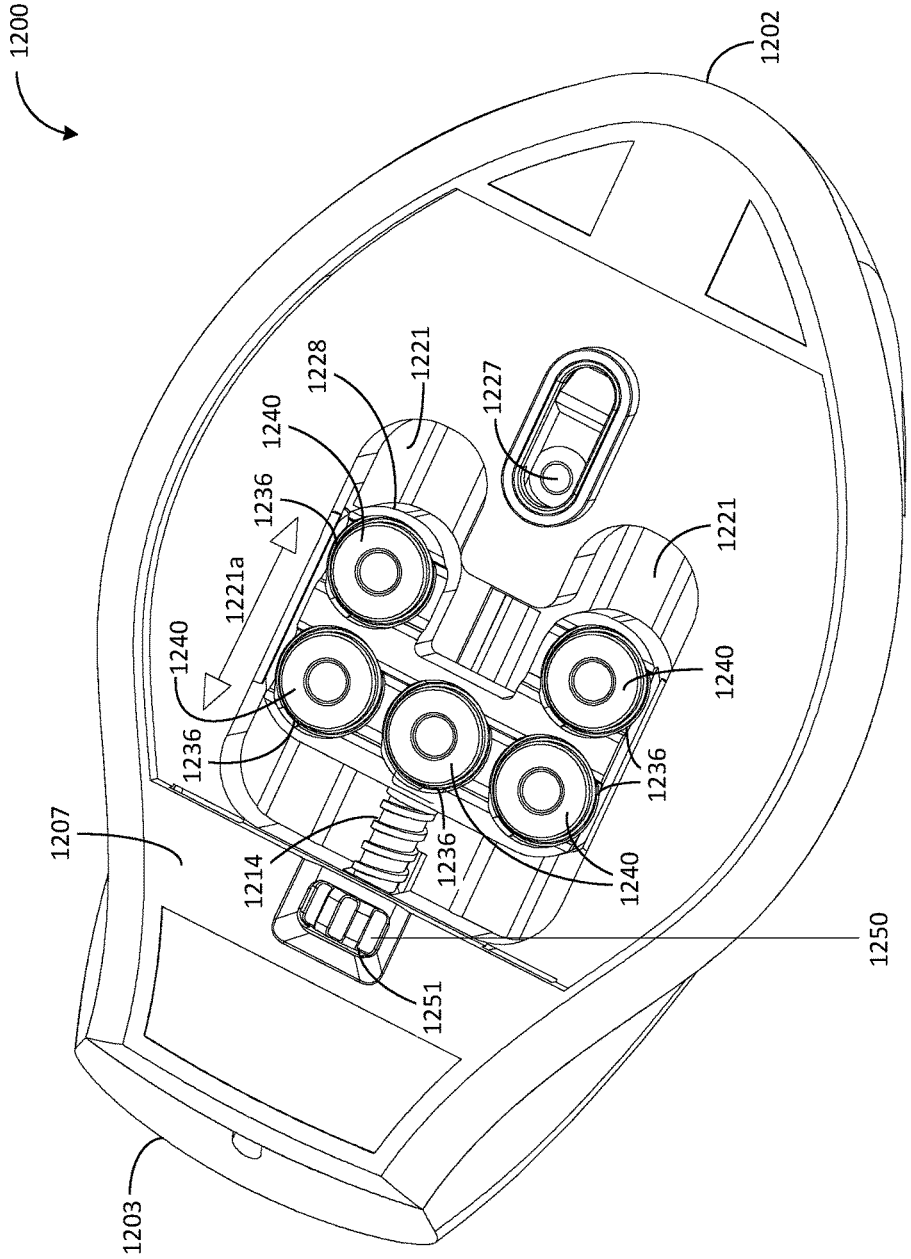
FIG. 12 illustrates manual control of the movable tray assembly of a computer mouse, according to certain embodiments.

FIG. 12 illustrates manual control of the movable tray assembly of a computer mouse, according to certain embodiments. FIG. 12 shows a front portion 1203, a rear portion 1202, a mouse sensor 1227, a track casing 1221, a movable weight tray assembly 1228 with its weight tray cover removed to reveal a plurality of weights 1240 loaded in respective weight slots 1236, a tunable wheel 1250 and its associated worm drive 1214 of computer mouse 1200. A user that wishes to change the position of the weight tray can access the tunable wheel 1250 through an aperture 1251 at the bottom casing of computer mouse 1200. The user can turn tunable wheel 1250 which in turn rotates the worm drive 1214, which in turn causes the weight tray assembly 1228 to slide (1221a) along the track casing 1221 in order to change the weight distribution of the computer mouse.

Figure 13:
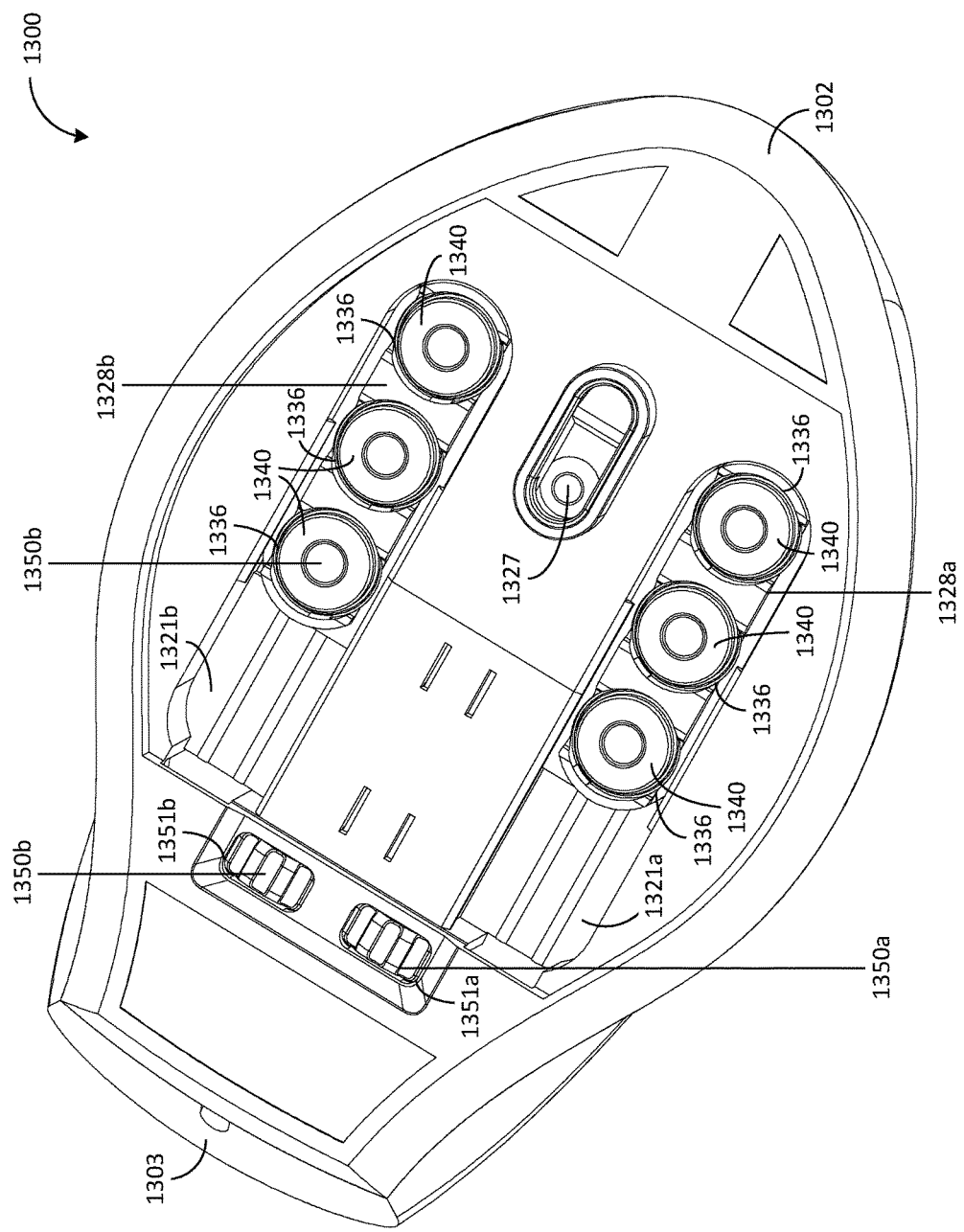
FIG. 13 illustrates manual control of multiple movable tray assemblies of a computer mouse using tunable wheels, according to certain embodiments.

FIG. 13 illustrates manual control of multiple movable tray assemblies of a computer mouse using tunable wheels, according to certain embodiments. FIG. 13 shows a front portion 1303, a rear portion 1302, a mouse sensor 1327, two track casings (1321a, 1321b), and two movable weight tray assemblies (1328a, 1328b) with its respective weight tray cover removed to reveal a plurality of weights 1340 loaded in respective weight slots 1336 of computer mouse 1300. Each movable tray assembly is associated with a corresponding tunable wheel (1350a, 1350b) and its associated worm drive. A user that wishes to change the position of one or both the weight tray assemblies can access the tunable wheels (1350a, 1350b) through respective apertures (1351a, 1351b) at the bottom casing of computer mouse 1300. The user can turn tunable wheels (1350a, 1350b) that, in turn, rotate their associated worm drive (not shown in FIG. 13) that, in turn, cause the weight tray assemblies (1328a, 1328b) to slide along their respective track casing (1321a, 1321b) in order to change the weight distribution of the computer mouse.

Figure 14A:
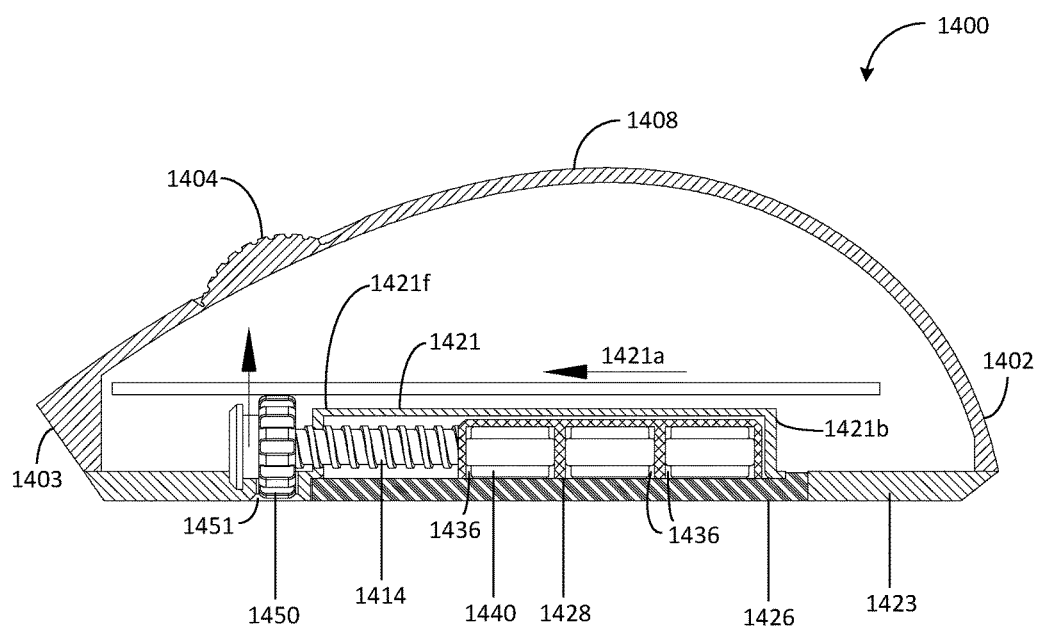
FIG. 14A and FIG. 14B illustrate a side view of a manual control of the movable tray assembly of a computer mouse, according to certain embodiments.
Figure 14B:
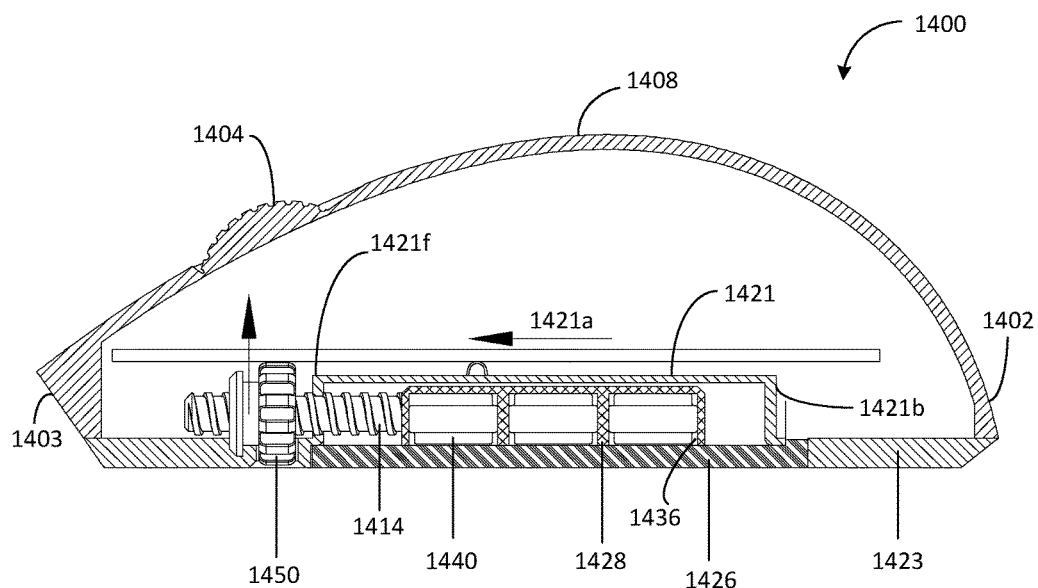

FIG. 14A and FIG. 14B illustrate a side view of a manual control of the movable tray assembly of a computer mouse, according to certain embodiments. FIG. 14A and FIG. 14B show a front portion 1403, a rear portion 1402, a scroll wheel 1404 (the details of the scroll wheel assembly are not shown in FIG. 14A and FIG. 14B) a top portion 1408, a bottom casing 1423, a bottom cover 1426, a track casing 1421 (with a front portion 1421f and a back portion 1421b), a movable weight tray assembly 1428 with a plurality of weights 1440 loaded in respective weight slots 1436, a tunable wheel 1450 and its associated worm drive 1414 of computer mouse 1400. A user that wishes to change the position of the weight tray can access the tunable wheel 1450 through an aperture 1451 at the bottom casing of computer mouse 1400. The user can turn tunable wheel 1450 which in turn rotates the worm drive 1414, which in turn causes the weight tray assembly 1428 to slide (1421a) along the track casing 1421 in order to change the weight distribution of the computer mouse. FIG. 14A shows that the weight tray assembly 1428 has been manually moved towards the back portion 1421b of the track casing 1421. FIG. 14B shows that the weight tray assembly 1428 has been manually moved towards the front portion 1421f of the track casing 1421.

Figure 15:
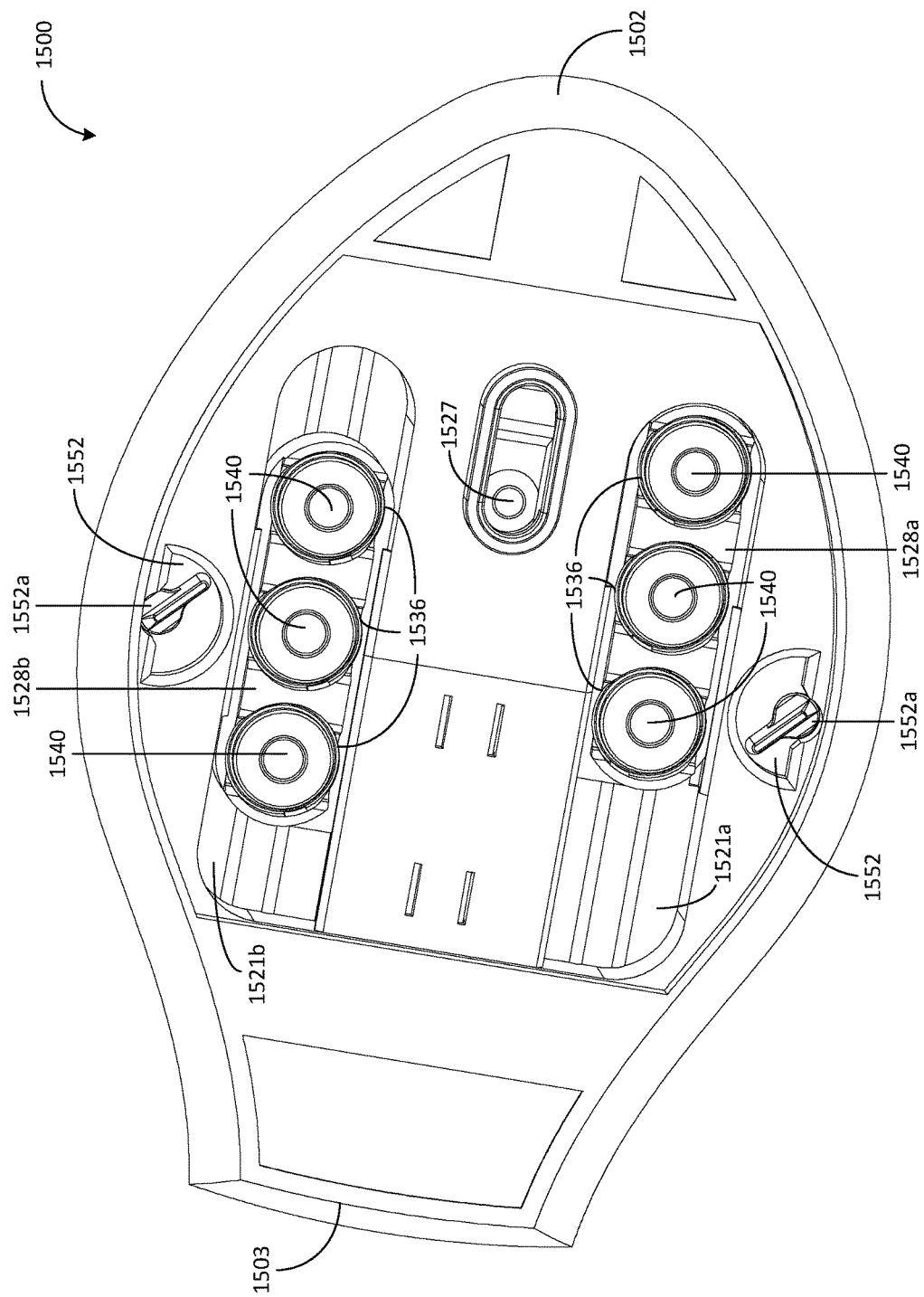
FIG. 15 illustrates manual control of multiple movable tray assemblies of a computer mouse, according to certain embodiments.

FIG. 15 illustrates manual control of multiple movable tray assemblies of a computer mouse, according to certain embodiments. FIG. 15 shows a front portion 1503, a rear portion 1502, a mouse sensor 1527, two track casings (1521a, 1521b), and two movable weight tray assemblies (1528a, 1528b) with its respective weight tray cover removed to reveal a plurality of weights 1540 loaded in respective weight slots 1536 of computer mouse 1500. A user that wishes to change the position of one or both the weight tray assemblies (1528a, 1528b) can use his/her fingers to push the weight tray assemblies to a desired position in the respective track casings (1521a, 1521b) in order to change the weight distribution of the computer mouse. Tray locks 1552 with handle 1552a can be used to lock the respective weight tray assemblies into position, according to certain embodiments.

Figure 16:
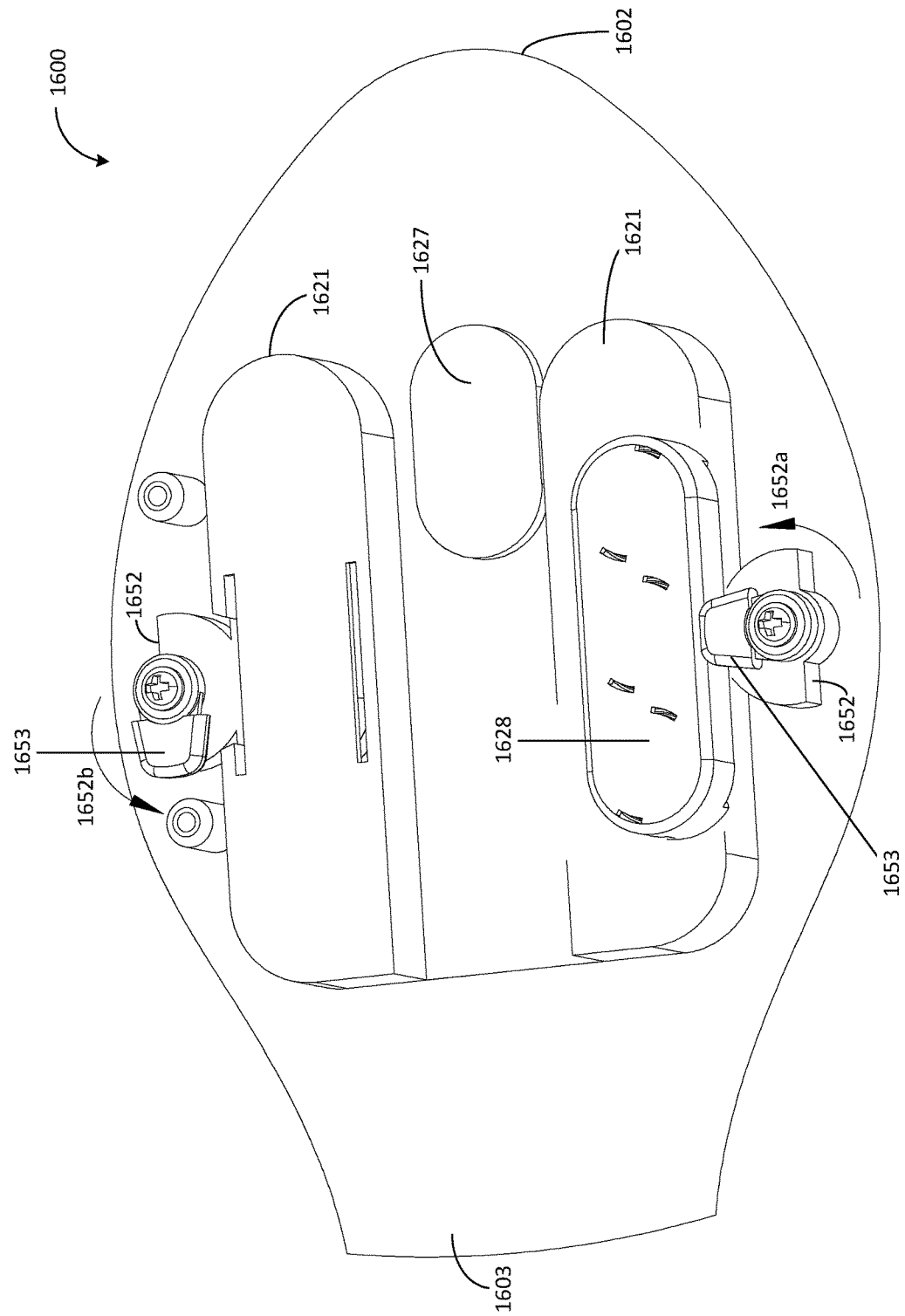
FIG. 16 illustrates the mechanics of tray locks associated with the manual control of multiple movable tray assemblies of a computer mouse, according to certain embodiments.

FIG. 16 illustrates the mechanics of tray locks associated with the manual control of multiple movable tray assemblies of a computer mouse, according to certain embodiments. FIG. 16 shows a front portion 1603, a rear portion 1602, a mouse sensor 1627 and two track casings 1621. Each track casing is associated with its respective movable weight tray assembly but only one weight tray assembly 1628 is shown in FIG. 16 in order not to obscure the tray locks 1652. Further, weight tray assembly 1628 is shown without the details of weight slots for the sake of simplicity in order not to obscure the tray locks 1652 in FIG. 16 of computer mouse 1600. According to certain embodiments, tray lock 1652 includes a lock stopper 1653. Tray lock 1652 can be rotated (1652a) such that lock stopper 1653 impinges upon the side of the weight tray assembly to lock the weight tray assembly into a desired position in track casing 1621. To unlock, tray lock 1652 can be rotated (1652b) such that lock stopper 1653 is swiveled away from the side of the weight tray assembly. As a non-limiting example, lock stopper 1653 may be made of a material that provides adequate friction in order to lock the weight tray assembly into a desired position. For example, the lock stopper may be a rubberized stopper, according to certain embodiments.

Figure 17A:
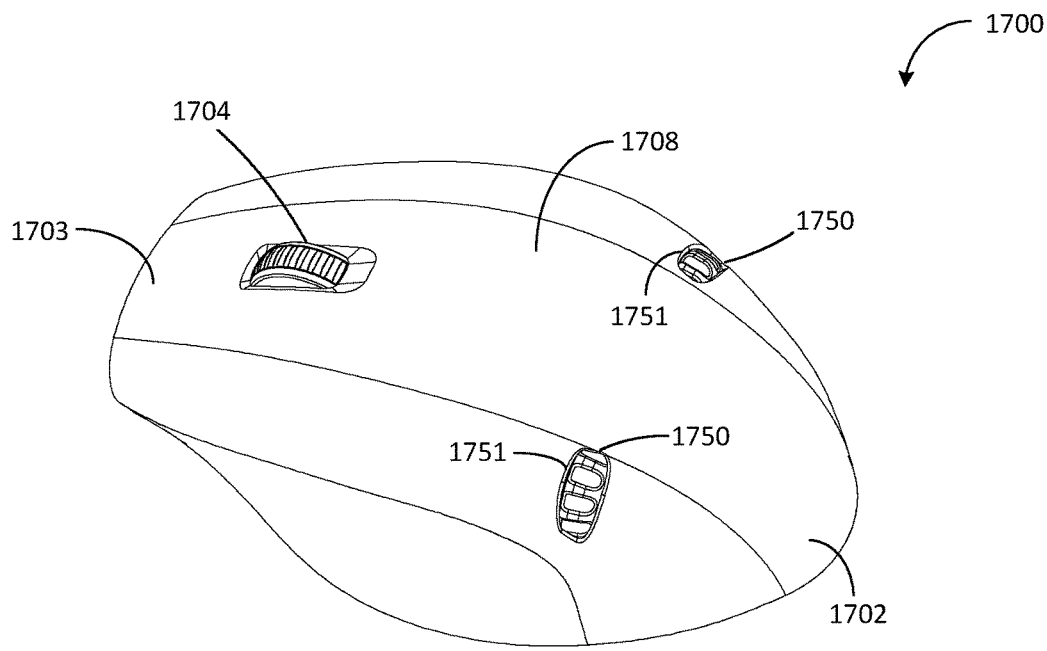
FIG. 17A illustrates a top left perspective view of the exterior of a computer mouse that includes manual control of multiple movable tray assemblies using tunable wheels, according to certain embodiments.

FIG. 17A illustrates a top left perspective view of the exterior of a computer mouse that includes manual control of multiple movable tray assemblies using tunable wheels, according to certain embodiments. The purpose of FIG. 17 is to show that the tunable wheels 1750 can be oriented for access through apertures 1751 on the top exterior 1708 of computer mouse 1700, according to certain embodiments. For purposes of context, FIG. 17A also shows a scroll wheel 1704, a front portion 1703, and a rear portion 1702 of computer mouse 1700.

Figure 17B:
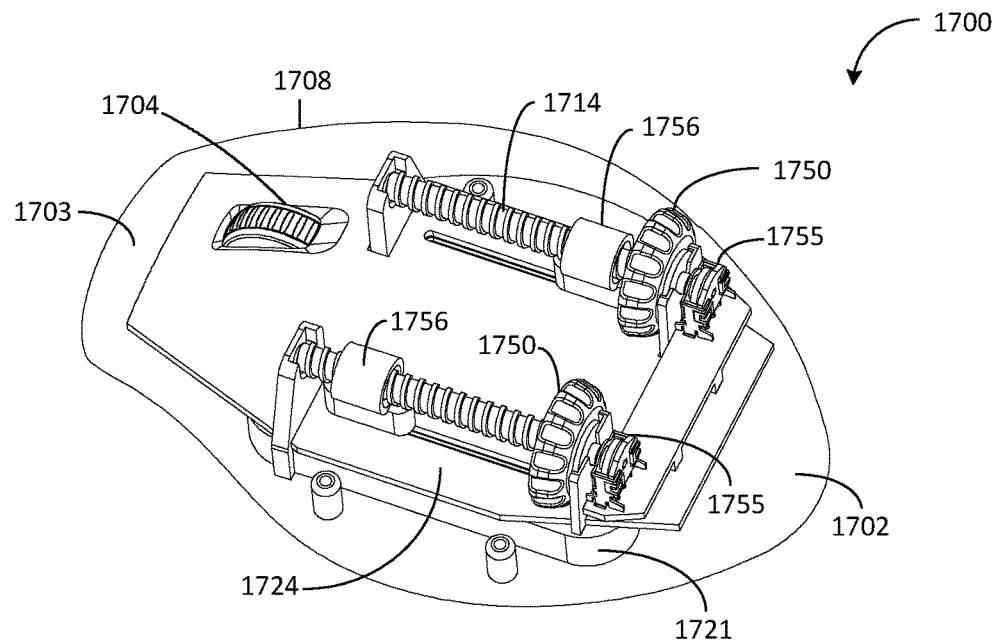
FIG. 17B illustrates the orientation of the tunable wheels inside the computer, which tunable wheels are associated with the manual control of multiple movable tray assemblies of the computer mouse, according to certain embodiments.

FIG. 17B illustrates the orientation of the tunable wheels inside the computer, which tunable wheels are associated with the manual control of multiple movable tray assemblies of the computer mouse 1700, according to certain embodiments. FIG. 17B shows a front portion 1703, a rear portion 1702, a scroll wheel assembly 1704, two track casings 1721 (and two associated movable weight tray assemblies not shown in FIG. 17B because the weight tray assemblies are obscured by the weight system printed circuit board 1724) of computer mouse 1700. Each movable tray assembly is associated with a corresponding tunable wheel 1750 and its associated worm drive 1714. According to certain embodiments, tunable wheels 1750 and their associated worm drives 1714 are positioned in the top half portion of the interior of computer mouse such that the tunable wheels are accessible from the top exterior of the computer mouse as described above with reference with FIG. 17A. A user that wishes to change the position of one or both the weight tray assemblies can access the tunable wheels 1750 through respective apertures 1751 at the top exterior of computer mouse 1700. The user can turn tunable wheels 1750 that, in turn, rotate their associated worm drive 1714 that, in turn, cause the weight tray assemblies (not shown in FIG. 17B) to slide along their respective track casing 1721 in order to change the weight distribution of the computer mouse. The worm drive 1714 has a sleeve 1756 that is attached to the weight tray assembly and thus, the worm drive can move the weight tray assembly as the user turns the tunable wheel 1750, according to certain embodiments. FIG. 17B also shows an encoder 1755 corresponding to each tunable wheel 1750, according to certain embodiments. The encoder 1755 can track the number of rotations of the tunable wheel in order to determine the travel distance of the sleeve 1756 so as to track the position of the weight trays in the track casing, according to certain embodiments. Even though FIG. 17A and FIG. 17B illustrate a pair of tunable wheels corresponding to a pair of weight tray assemblies, the embodiments are not restricted to a pair of tunable wheels and a pair of weight tray assemblies. The number of weight tray assemblies and the number of tunable wheels may vary from implementation to implementation.

Figure 18:
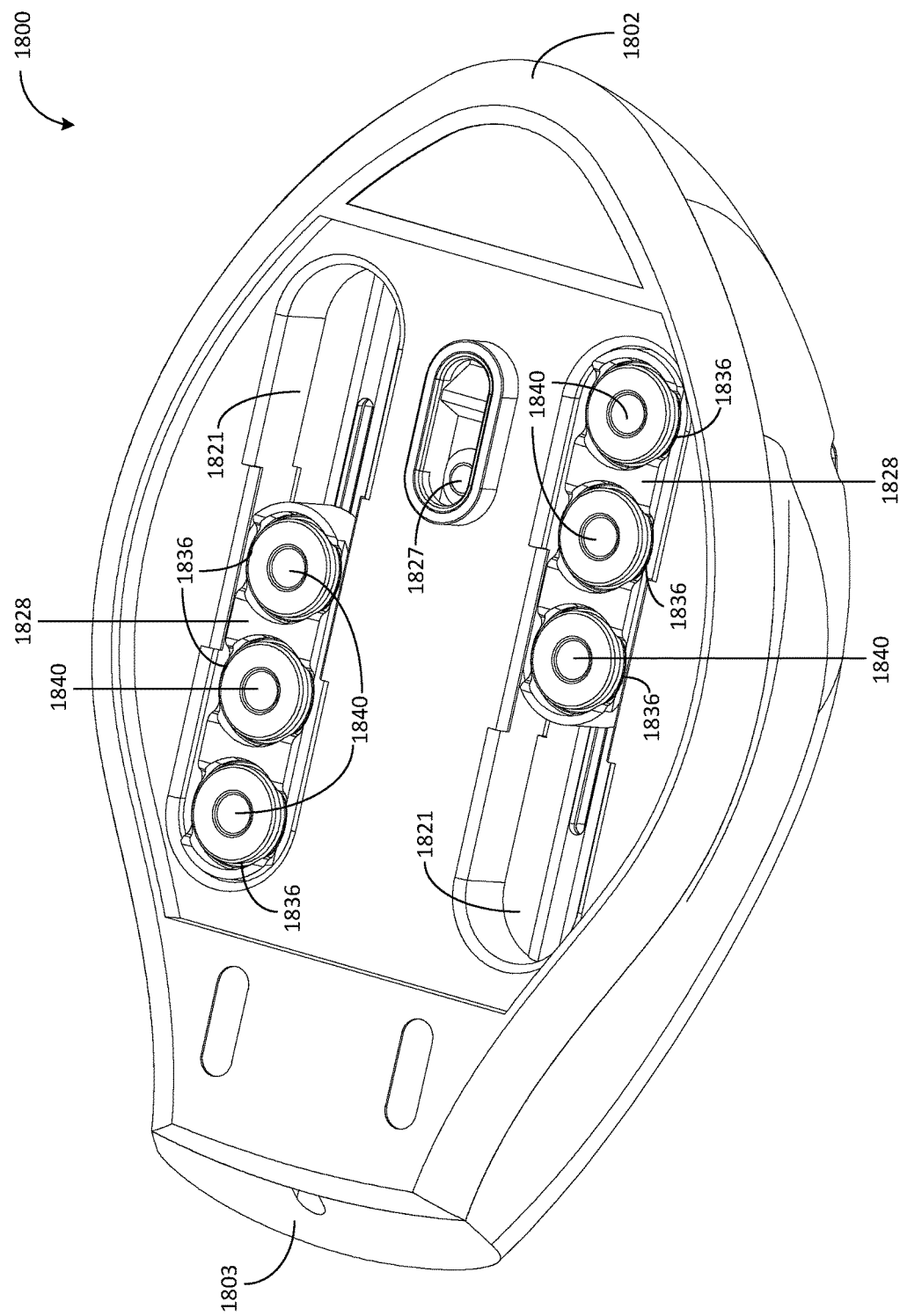
FIG. 18 illustrates a bottom perspective view of a computer mouse with tunable wheels and their associated worm drives positioned in the top half portion of the interior of computer mouse, according to certain embodiments.

FIG. 18 illustrates a bottom perspective view of a computer mouse that employs manual control of multiple movable tray assemblies of a computer mouse using tunable wheels and their associated worm drives are positioned in the top half portion of the interior of computer mouse such that the tunable wheels are accessible from the top exterior of the computer mouse as described above with reference with FIG. 17A and FIG. 17B, according to certain embodiments. FIG. 18 shows a front portion 1803, a rear portion 1802, a mouse sensor 1827, two track casings 1821, and two movable weight tray assemblies 1828 with its respective weight tray cover removed to reveal a plurality of weights 1840 loaded in respective weight slots 1836 of computer mouse 1800. A user that wishes to change the position of one or both the weight tray assemblies can access the tunable wheels (not shown in FIG. 18 but are shown and described with reference to at least FIGS. 17A and 17B) through respective apertures at the top exterior casing of the computer mouse.

Figure 19:
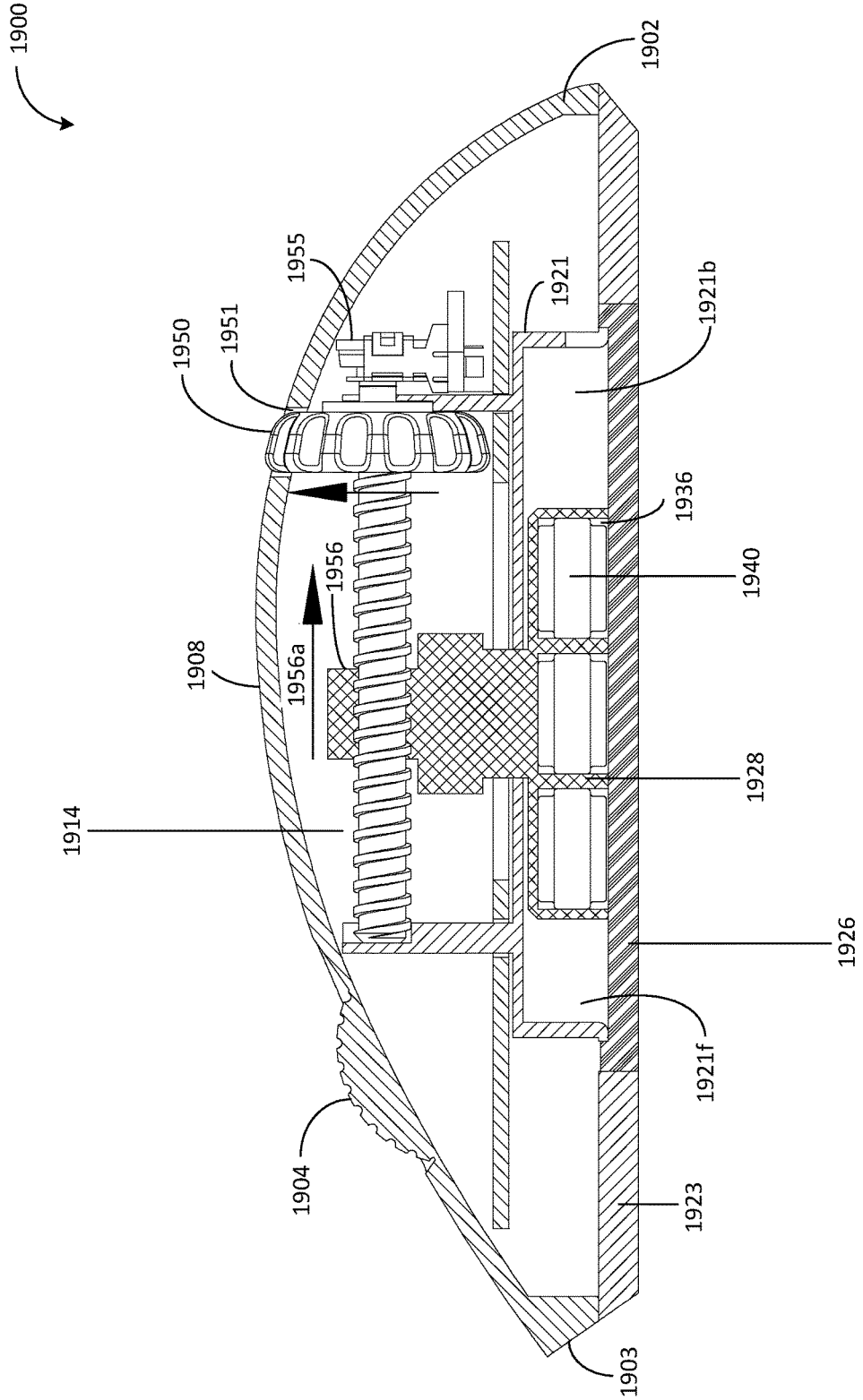
FIG. 19 illustrates a side view of a manual control of the movable tray assembly of a computer mouse, according to certain embodiments.

FIG. 19 illustrates a side view of a manual control of the movable tray assembly of a computer mouse, according to certain embodiments. FIG. 19 shows a front portion 1903, a rear portion 1902, a scroll wheel 1904 (the details of the scroll wheel assembly are not shown in FIG. 19 so as not to obscure the details of the manual tunable wheel and associated worm drive), a top exterior 1908, a bottom casing 1923, a bottom cover 1926, a track casing 1921 (with a front portion 1921f and a back portion 1921b), a movable weight tray assembly 1928 with a plurality of weights 1940 loaded in respective weight slots 1936, a tunable wheel 1950 and its associated worm drive 1914 of computer mouse 1900. FIG. 19 also shows that tunable wheel 1950 and its associated worm drives 1914 are positioned in the top half portion of the interior of computer mouse such that the tunable wheel is accessible from the top exterior 1908 of the computer mouse through aperture 1951. A user that wishes to change the position of the weight tray assembly can turn tunable wheel 1950 that, in turn, rotates its associated worm drive 1914 that, in turn, causes the weight tray assembly 1928 to slide along the track casing 1921 in order to change the weight distribution of the computer mouse. The worm drive 1914 has a sleeve 1956 that is attached to the weight tray assembly and thus, the worm drive can move the weight tray assembly as the user turns the tunable wheel 1950, according to certain embodiments. FIG. 19 also shows an encoder 1955 corresponding to the tunable wheel 1950, according to certain embodiments. The encoder 1955 can track the number of rotations made by the tunable wheel in order to determine the travel distance of the sleeve 1956 so as to track the position of the weight trays in the track casing, according to certain embodiments.

Figures 20A, 20B:
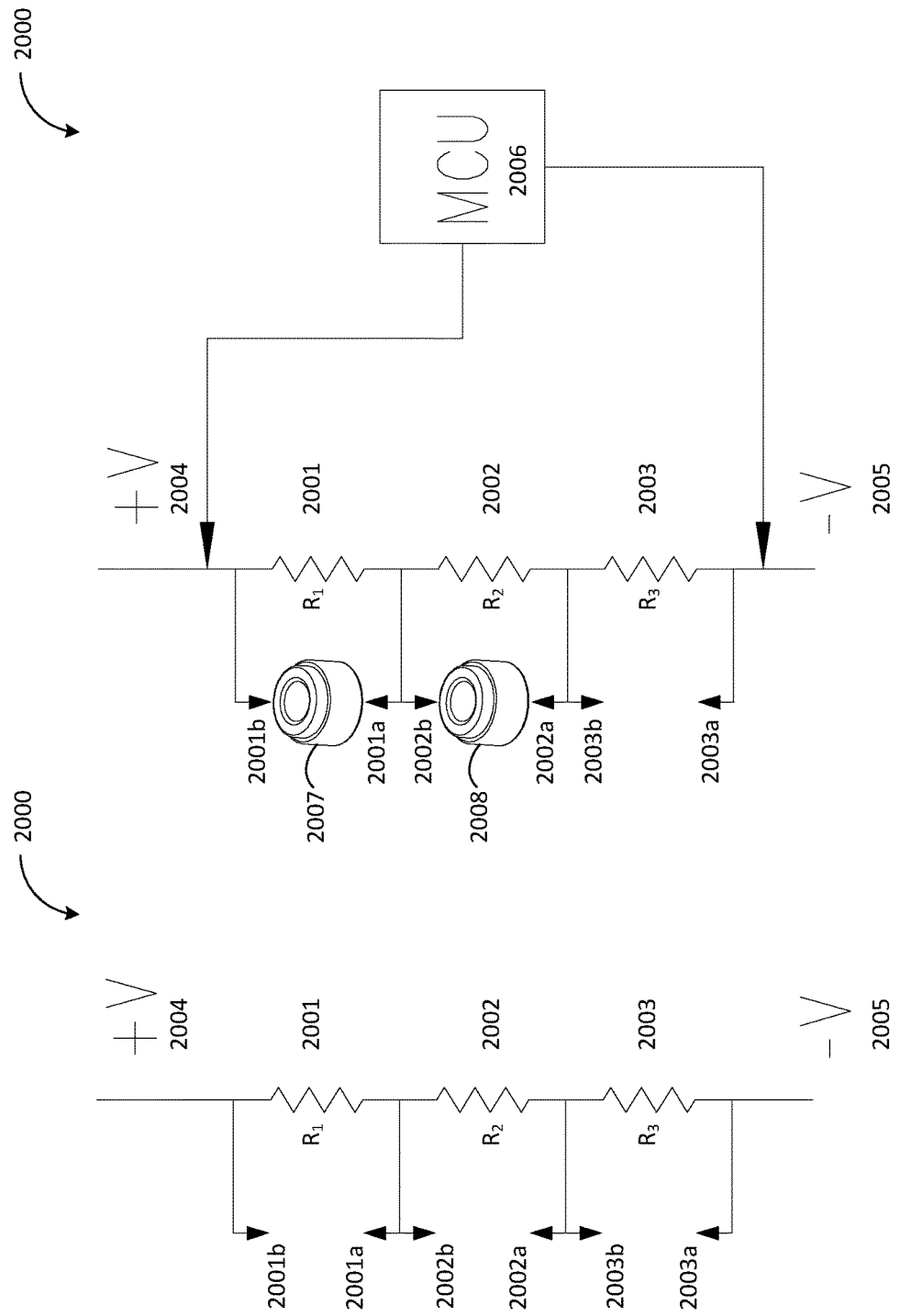
FIG. 20A and FIG. 20B illustrate a circuit diagram of a sample resistor ladder, according to certain embodiments.

According to certain embodiments, the moveable weight system detects the presence of a given weight in a given weight tray when the given weight acts as a switch bridge to short out a corresponding resistor in a resistor ladder associated with the given weight tray. FIG. 20A and FIG. 20B illustrate a circuit diagram of a sample resistor ladder 2000, according to certain embodiments. Resistor ladder 2000, comprises a plurality of resistors (2001, 2002, 2003) to form a voltage difference between the end points (2004, 2005) of the resistor ladder 2000. Resistor 2001 is associated with two contact points 2001A, 2001B. Similarly, resistor 2002 is associated with two contact points 2002A, 2002B and resistor 2003 is associated with two contact points 2003A, 2003B. According to certain embodiments, each of the plurality of resistors has a unique resistance value (unique as to the value of other resistors in resistor ladder 2000). For example, resistor 2001 has a resistance value of R1, resistor 2002 has a resistance value of R2, and resistor 2003 has a resistance value of R3. By having different resistor values in the resistor ladder to correspond to different positions in the given weight tray, allows a micro controller unit that measures the voltage across the resistor ladder to determine the position of the weights in the given tray. For example, the resistor ladder comprises resistors with resistor values such that each combination of resistors, that has not been shorted out by one or more switch bridges, has a unique total resistance value, according to certain embodiments. For example, the resistor ladder comprises electrical circuitry on the side of the weight tray or it can be built into the weight tray, according to certain embodiments. FIG. 20B shows a micro controller unit 2006 (MCU). MCU 2006 measures the voltage difference between end points 2004, 2005 of the resistor ladder 2000. To explain, with reference to FIG. 20B, assume a weight 2007 is placed in a position within the weight tray that is associated with resistor ladder 2000 so as to make contact with contact points 2001A, 2001B associated with resistor 2001. Weight 2007 acts as a switch to bridge the contact points 2001A, 2001B, and thus shorts out resistor 2001. Similarly, assume weight 2008 is placed in the weight tray so as to make contact with contact points 2002A, 2002B associated with resistor 2002. Weight 2008 acts as a switch to bridge the contact points 2002A, 2002B, and thus shorts out resistor 2002. When MCU 2006 measures the voltage difference between end points 2004, 2005 of the resistor ladder 2000, MCU 2006 can detect that a weight is present in the specific location in the weight tray that is associated with resistor 2001, as well as detect the presence of a weight in the location that is associated with resistor 2002. Similarly, MCU 2006 can determine that there is no weight present in the location that is associated with resistor 2003. Further, the weight tray can be designed to have each weight slot (associated with a unique resistor value) to only hold a weight that has a value that is unique to the value of the other weights that can be loaded in the weight tray. Is such a case, the movable weight system can determine not only the presence of a weight in a given slot in the weight tray, the movable weight system can also determine the value (mass) of the weight in the given slot.

Figure 21A:
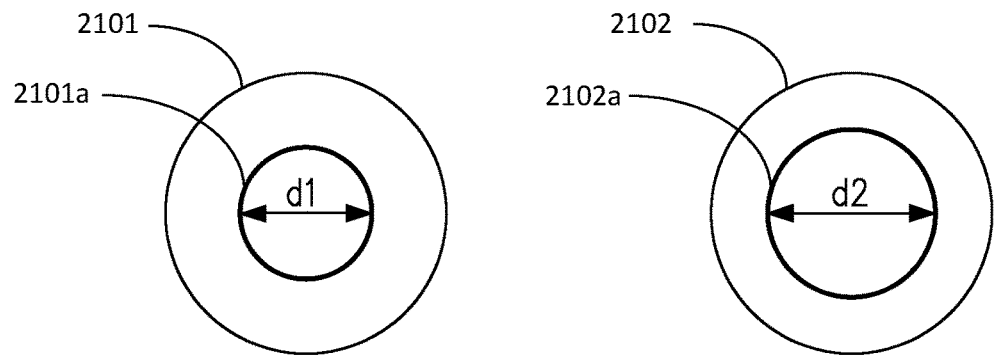
FIG. 21A and FIG. 21B illustrate a non-limiting example of identifying a given weight by the distance between a given pair of tray contact points made by the weight contact points of the given weight, according to certain embodiments.
Figure 21B:
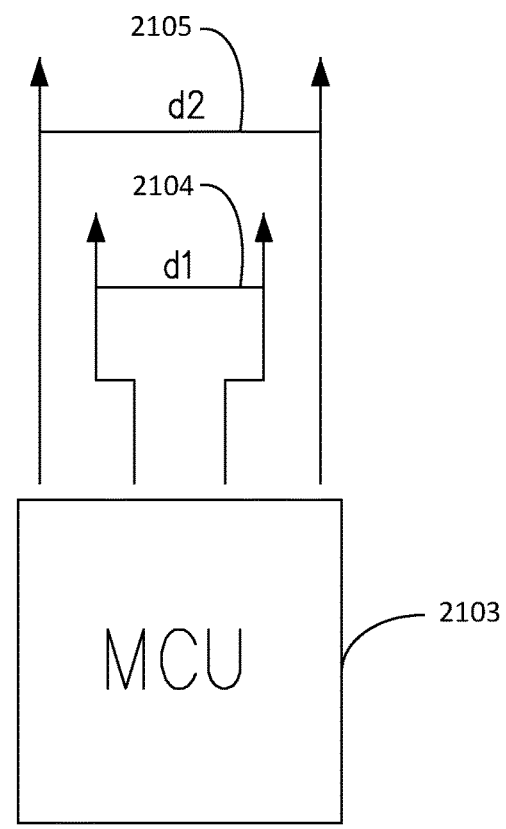
Figure 22:
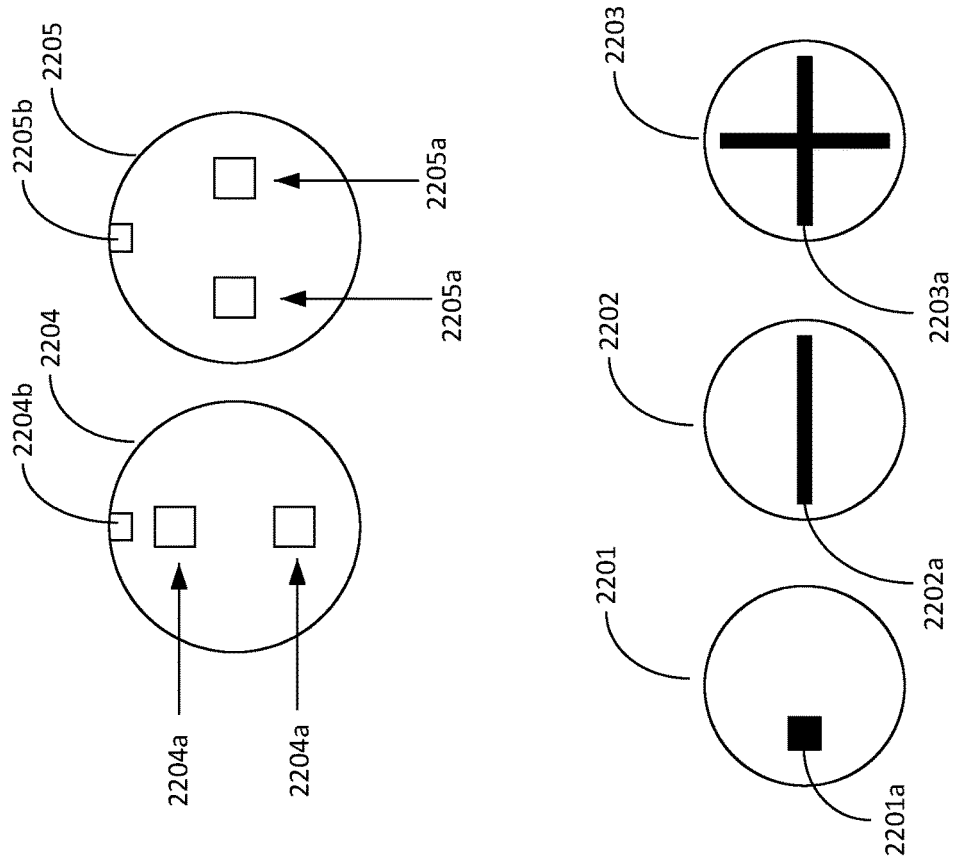
FIG. 22 illustrates a non-limiting example of identifying a given weight by the given weight's set of weight contact points that will contact a unique set of tray contact points when the given weight is placed in the weight tray, according to certain embodiments.

FIG. 21A, FIG. 21B and FIG. 22 illustrate the identification of weights based on the weight contact points on a given weight making contact with two or more tray contact points on the weight tray when the given weight is inserted in the weight tray, according to certain embodiments. A micro controller unit in the computer mouse can detect which tray contact points on the weight tray are making contact with weight contact points in order to determine the type of weight that is inserted in the weight tray, according to certain embodiments.

FIG. 21A and FIG. 21B illustrate a non-limiting example of identifying a given weight by the distance between a given pair of tray contact points made by the weight contact points of the given weight, according to certain embodiments. FIG. 21A shows a bottom view of weight 2101 that has a contact portion (weight contact point) 2101a. Weight contact portion 2101a is in the form of a ring with a diameter D1. To explain, when weight 2101 is placed in a weight tray, weight 2101 makes contact with a pair of corresponding tray contact points that are D1 distance apart (for example, D1 is measured by drawing an imaginary straight line between the pair of corresponding tray contact points). FIG. 21A also shows a bottom view of weight 2102 that has a weight contact portion 2102a. Weight contact portion 2102a is in the form of a ring with a diameter D2. When weight 2102 is placed in a weight tray, weight 2102 makes contact with a pair of corresponding tray contact points that are D2 distance apart (for example, D2 is measured by drawing an imaginary straight line between the pair of corresponding tray contact points). D1 and D2 are distinct from each other. Assume for purposes of illustration that D1 is less than D2.

FIG. 21B shows a micro controller unit 2103 (MCU) associated with weights 2101, 2102. MCU 2103 is capable of measuring the distances D1 2104, and D2 2105 between respective tray contact points. Thus, MCU 2103 can identify a given weight by measuring the distances D1 2104 and D2 2105. To explain, when MCU 2103 determines the distance between a given pair of tray contact points made by the weight contact points is D1 2104, then MCU 2103 identifies the weight 2101 as the weight that is making contact with the corresponding pair of tray contact points that are D1 2104 distance apart.

FIG. 22 illustrates a non-limiting example of identifying a given weight by the given weight's set of weight contact points that will contact a unique set of tray contact points when the given weight is placed in the weight tray, according to certain embodiments. FIG. 22 shows the bottom view of a plurality of weights 2201, 2202, 2203, 2204, and 2205 that illustrate a variety of patterns of weight contact points. The bottom view of weight 2201 shows a weight contact portion 2201a that is skewed to one side of the bottom portion of weight 2201. The bottom view of weight 2202 shows a weight contact portion 2202a that has a rectangular bar shape (in the horizontal direction) across the diameter of the bottom surface of weight 2202. The bottom view of weight 2203 shows a weight contact portion 2203a that has a cross bar shape across the diameter of the bottom surface of weight 2203. The bottom view of weight 2204 shows weight contact portions 2204a along a vertical axis of the bottom surface of weight 2204. The weight contact portions 2204a comprises two discrete portions of which each portion is located near an edge of the bottom of weight 2204. Notch 2204b of weight 2204 orients weight 2204 in the weight tray such that weight contact portions 2204a are aligned along a vertical axis of the weight tray slot when weight 2204 is placed in the weight tray slot. The bottom view of weight 2205 shows a weight contact portion 2205a along a horizontal axis of the bottom surface of weight 2205. The weight contact portions 2205a comprises two discrete portions of which each portion is located near an edge of the bottom of weight 2205. Notch 2205b of weight 2205 orients weight 2205 in the weight tray such that weight contact portions 2205a are aligned along a horizontal axis of the weight tray slot when weight 2205 is placed in the weight tray slot. The alignment is not restricted to the horizontal or vertical axis direction. According to certain embodiments, a given weight of at least a subset of the plurality of weights include a notch that physically aligns the given weight in a predetermined position in the weight tray when the given weight is placed in the weight tray. The predetermined position for alignment may vary from implementation to implementation.

Figure 23A:
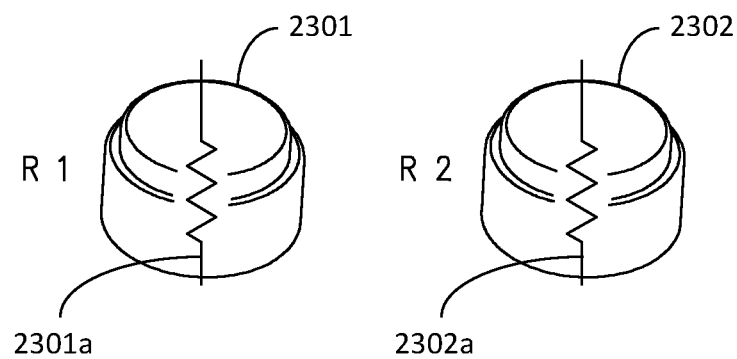
FIG. 23A and FIG. 23B illustrate the identification of a given weight based on a resistor embedded in the given weight.
Figure 23B:
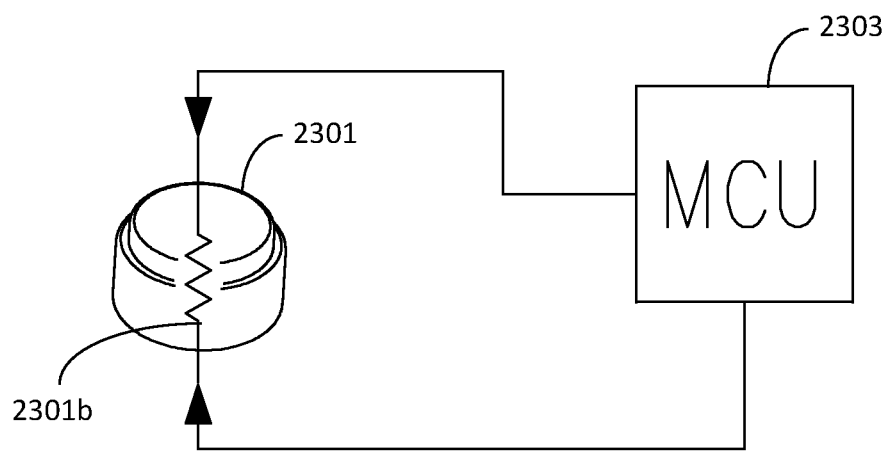

FIG. 23A and FIG. 23B illustrate the identification of a given weight based on a resistor embedded in the given weight. For example, each weight of at least a subset of the plurality weights for use in the movable weight system of the computer mouse includes a resistor embedded in the weight, according to certain embodiments. FIG. 23A shows two sample weights 2301, 2301 of a plurality of weights associated with a movable weight system of a computer mouse. Weight 2301 includes a resistor 2301a (of resistance value R1) embedded in the body of weight 2301. Similarly weight 2302 includes a resistor 2302a (of resistance value R2) embedded in the body of weight 2302. R1 and R2 are distinct from each other. Assume for purposes of illustration that R1 is less than R2. A micro controller unit can electrically measure the value of the embedded resistor using an analog-to-digital convertor circuit, for example. FIG. 23B shows a micro controller unit (MCU) 2303. MCU 2303 includes an analog-to-digital convertor that measures the resistance value of 2301a of weight 2301. Similarly, MCU 2303 can measure the resistance value of 2302a of weight 2302.

Figure 24:
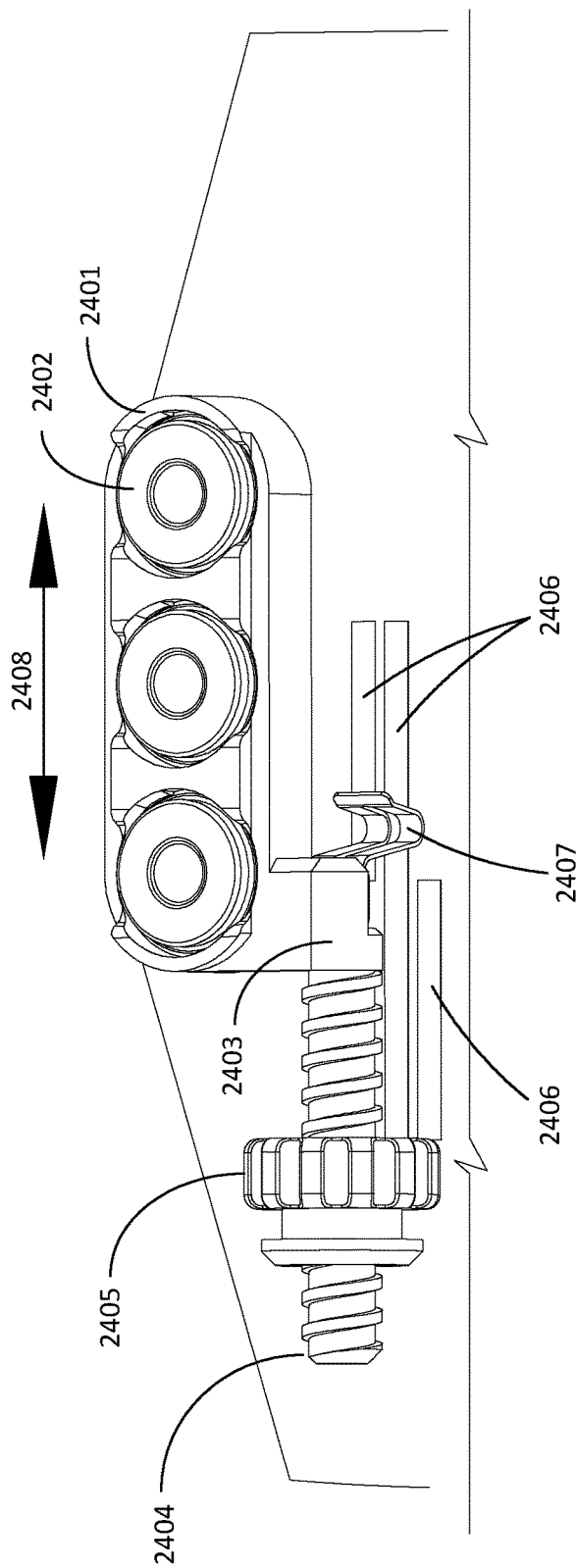
FIG. 24 illustrates a weight tray of the moveable weight system in the computer mouse where the weight includes a wiper that moves over a variable resistor, according to certain embodiments.

FIG. 24 illustrates a weight tray of the moveable weight system in the computer mouse where the weight includes a wiper that moves over a variable resistor, according to certain embodiments. FIG. 24 shows weight tray 2401 (with associated weights 2402 in the weight tray slots). Weight tray 2401 is attached to a worm drive 2404 by a sleeve 2403. Attached to sleeve 2403 is a contact spring 2407. When tunable wheel 2405 is rotated, the worm drive 2404 causes the weight tray 2401 and the contact spring 2407 to move (2408) across the variable resistor contact brushes 2406. The variable resistor contact brushes 2406 are fixed in position relative to the weight tray so that as the weight tray moves in the mouse computer as previously described herein, the contact spring 2407 (acts as a wiper) that is fixed to the weight tray moves over the variable resistor contact brushes, according to certain embodiments. A micro controller unit determines the position of the weight tray by measuring the resistance of the variable resistors, according to certain embodiments.

Figure 25:
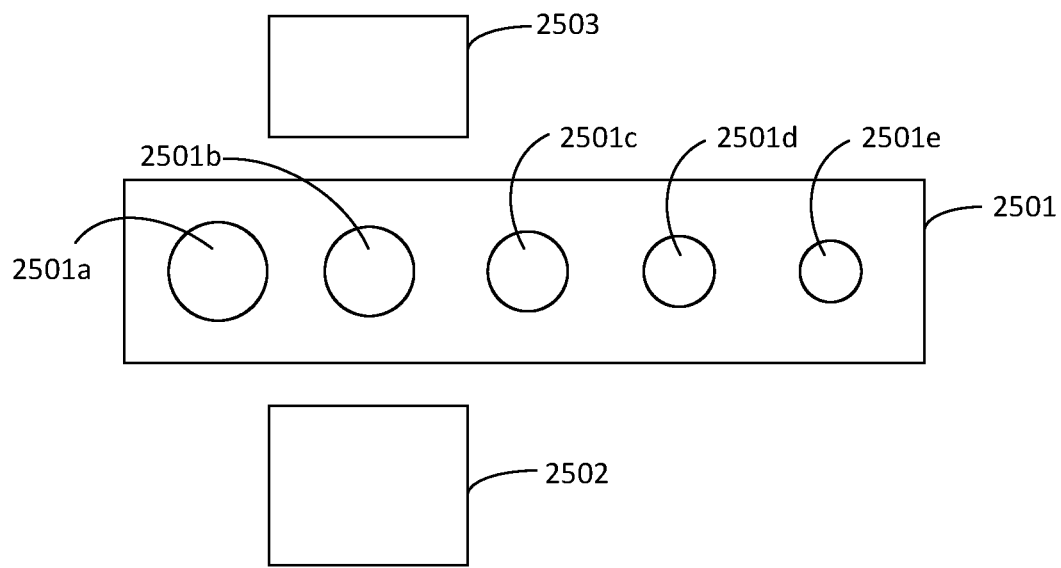
FIG. 25 illustrates determining the position of a weight tray of a movable weight system of a computer mouse by using a light sensor, according to certain embodiments.

FIG. 25 illustrates determining the position of a weight tray of a movable weight system of a computer mouse by using a light sensor, according to certain embodiments. FIG. 25 shows a weight tray 2501, a light source 2502 on one side of the track in which the weight tray is moving inside the computer mouse and a micro controller light sensor 2503 on the other side of the track. According to certain embodiments, the weight tray 2501 has a row of differently sized holes (2501a-2501e). Each hole corresponds to an absolute location of the weight tray 2501 in the computer mouse. The embodiments are not restricted to a specific number of holes. The number of holes may vary from implementation to implementation. When the weight tray 2501 moves along the track from location to location, the light (from light source 2502) that passes through the hole corresponding to each location is sensed by the micro controller light sensor 2503. Thus, the micro controller light sensor 2503 can determine the location of the weight tray since each hole allows a different amount of light to pass through due to the different size of each hole.

Figure 26:
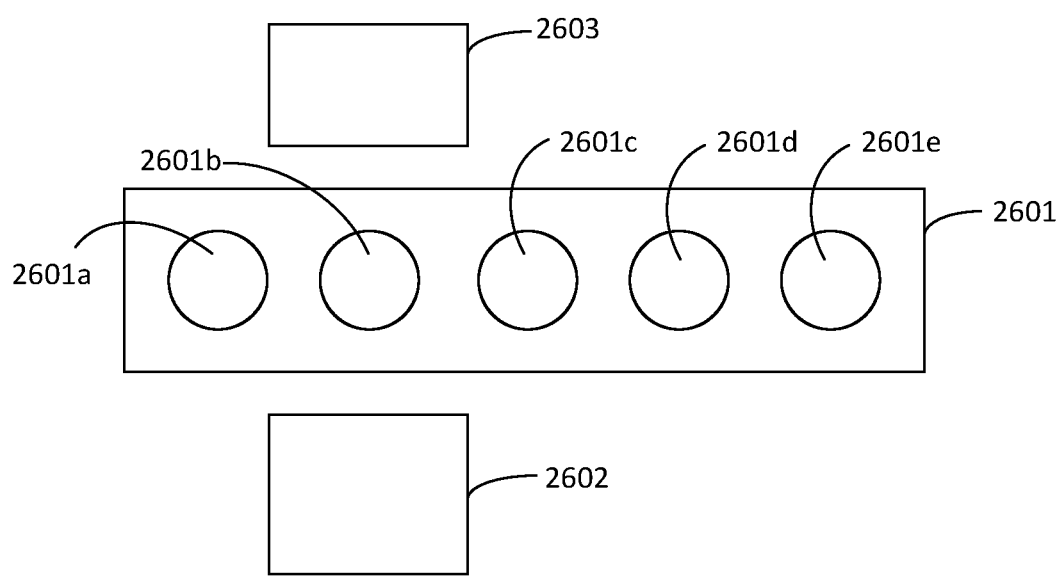
FIG. 26 illustrates determining the position of a weight tray of a movable weight system of a computer mouse by using same sized holes in the weight tray for light to pass through, according to certain embodiments.

FIG. 26 illustrates determining the position of a weight tray of a movable weight system of a computer mouse by using same sized holes in the weight tray for light to pass through, according to certain embodiments. FIG. 26 shows a weight tray 2601, a light source 2602 on one side of the track in which the weight tray is moving inside the computer mouse and a micro controller light sensor 2603 on the other side of the track. According to certain embodiments, the weight tray 2601 has a row of same sized holes (2601a-2601e). In such a case, the micro controller light sensor 2603 can determine the location of the weight tray 2601 by counting the number of light pulses passing in front of the micro controller light sensor 2603 as the weight tray 2601 is moving from a reference location.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A computer mouse comprising:
 a moveable weight tray assembly, the moveable weight tray assembly including:
 at least one weight tray disposed in at least one track casing such that the at least one weight tray can be positioned into any one of a plurality of positions inside the at least one track casing, wherein each of the plurality of positions corresponds to a new center of gravity of the computer mouse;
 a drive system for moving the at least one weight tray along inside of the at least one track casing to the plurality of positions inside the at least one track casing, the drive system includes a worm drive associated with the weight tray, the drive system is associated with a motor for motorized control of the drive system for moving the at least one weight tray along the at least one track casing,
 wherein the at least one weight tray includes one or more weight slots for holding corresponding one or more removable weights; and
 a transmission gear associated with the worm drive, the transmission gear can be turned to rotate the worm drive, so that the moveable weight tray assembly is allowed to slide along the respective track casing to change the weight distribution of the computer mouse.

2. The computer mouse of claim 1, wherein the at least one weight tray is associated with a resistor ladder, where the resistor ladder includes a plurality of resistors for detecting a presence of one or more weights in the at least one weight tray and for detecting a corresponding position of the one or more weights in the at least one weight tray.

3. The computer mouse of claim 1, wherein the at least one weight tray is associated with a plurality of tray contact points for contacting corresponding weight contact points of one or more weights when the one or more weights are placed in the at least one weight tray.

4. The computer mouse of claim 1, wherein the at least one weight tray is connected to a wiper of a slide potentiometer, and the at least one weight tray and the slide potentiometer are associated with a micro controller for determining a position of the at least one weight tray along the at least one track casing.

5. The computer mouse of claim 1, wherein the at least one track casing includes a plurality of contact pads, wherein the plurality of contact pads is communicatively attached to a micro controller for determining a position of the at least one weight tray along the at least one track casing.

* * * * *